US006973555B2

(12) United States Patent
Fujiwara et al.

(10) Patent No.: US 6,973,555 B2
(45) Date of Patent: Dec. 6, 2005

(54) STORAGE DEVICE AND SYSTEM FOR PROVIDING COMMUNICATIONS BUFFER RESERVATION FUNCTION

(75) Inventors: Keisei Fujiwara, Kawasaki (JP); Naoko Iwami, Sagamihara (JP); Naoki Watanabe, Sagamihara (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/803,227

(22) Filed: Mar. 16, 2004

(65) Prior Publication Data

US 2005/0080874 A1    Apr. 14, 2005

(30) Foreign Application Priority Data

Oct. 14, 2003  (JP)  ............................. 2003-353212

(51) Int. Cl.⁷ ............................................. G06F 13/28
(52) U.S. Cl. .................... 711/170; 709/206; 370/392
(58) Field of Search ................... 711/170; 709/206; 370/392; 719/321

(56) References Cited

U.S. PATENT DOCUMENTS

| | | |
|---|---|---|
| 5,345,584 A | 9/1994 | Hill |
| 5,379,412 A | 1/1995 | Eastridge et al. |
| 5,450,546 A | 9/1995 | Krakirian |
| 5,506,988 A | 4/1996 | Healy |
| 5,579,507 A | 11/1996 | Hosouchi et al. |
| 5,613,073 A | 3/1997 | Hammond, Jr. et al. |
| 5,701,465 A | 12/1997 | Baugher et al. |
| 5,732,402 A | 3/1998 | Lehman |
| 5,742,792 A | 4/1998 | Yanai et al. |
| 5,790,886 A | 8/1998 | Allen |
| 5,838,994 A | 11/1998 | Valizadeh |
| 5,931,918 A * | 8/1999 | Row et al. ................... 719/321 |
| 5,943,690 A | 8/1999 | Dorricott et al. |
| 6,044,444 A | 3/2000 | Ofek |
| 6,115,784 A | 9/2000 | Dorricott et al. |
| 6,173,377 B1 | 1/2001 | Yanai et al. |
| 6,502,205 B1 | 12/2002 | Yanai et al. |
| 6,549,982 B1 | 4/2003 | Yamanaka |
| 6,571,326 B2 | 5/2003 | Spiegel et al. |
| 6,684,306 B1 | 1/2004 | Nagasawa et al. |
| 6,728,849 B2 | 4/2004 | Kodama |
| 2002/0095471 A1 | 7/2002 | Maciel |
| 2005/0025150 A1 * | 2/2005 | Helmy et al. ................ 370/392 |
| 2005/0055406 A1 * | 3/2005 | Singhai et al. ............... 709/206 |

FOREIGN PATENT DOCUMENTS

JP    2002-208981    7/2002

* cited by examiner

*Primary Examiner*—Mano Padmanabhan
*Assistant Examiner*—Duc T Doan
(74) *Attorney, Agent, or Firm*—Townsend and Townsend and Crew LLP

(57) ABSTRACT

A storage device (1) communicating with a host computer and other storage devices through a network is characterized in that the storage device (1) secures memory buffers for temporarily storing data in a remote copy operation carried out between the storage devices. A network memory (100) in the storage device (1) includes an available buffer comprising a plurality of memory buffers and an in-use buffer also comprising a plurality of memory buffers. A buffer control unit (215) secures memory buffers of the available buffer as a reserved buffer having a reserved-buffer size specified in a buffer reservation request made by a storage management device (8) in response to the request. The buffer control unit (215) then allocates the memory buffers of the reserved buffer as the in-use buffer in response to a request received from the storage management device (8) to start a remote copy operation.

20 Claims, 12 Drawing Sheets

FIG. 3(a)

101 RESERVED-BUFFER INFORMATION TABLE

| MASTER-PORT IP ADDRESS (301) | REMOTE-PORT IP ADDRESS (302) | BUFFER ADDRESS (303) | RESERVED-BUFFER SIZE (304) |
|---|---|---|---|
| 211.19.1.20 | 133.185.12.20 | 0x0FFFFF | 2.1M |
| 211.19.3.85 | 172.83.1.21 | 0xFF00CC | 4.5M |
| ... | ... | ... | ... |

FIG. 3(b)

108 NETWORK-PATH INFORMATION TABLE

| MASTER-PORT IP ADDRESS (401) | REMOTE-PORT IP ADDRESS (402) | BAND-WIDTH (403) | LATENCY (404) | NUMBER OF SESSIONS (405) | NUMBER OF CONNECTIONS (406) |
|---|---|---|---|---|---|
| 211.19.1.20 | 133.185.12.20 | 10M | 2.8μ | 2 | 3 |
| 211.19.3.85 | 172.83.1.21 | 45M | 1.2μ | 1 | 4 |
| ... | ... | ... | ... | ... | ... |

STORAGE DEVICE AND SYSTEM FOR PROVIDING COMMUNICATIONS BUFFER RESERVATION FUNCTION

The present application claims priority from the Japanese patent application JP2003-353212 filed on Oct. 14, 2003, the content of which is hereby incorporated by reference into this application.

BACKGROUND OF THE INVENTION

The present invention relates to a storage device, which communicates with a plurality of information-processing devices connected to the storage device by a network through the network. More particularly, the present invention relates to a storage device having a function of controlling a buffer used as a network interface.

Accompanying penetration of an information technology into the mainstay jobs of companies and organizations, the importance and amount of electronic data owned by the companies and the organizations are increasing. It is thus necessary to keep an accurate copy of data to protect the data against a large-scale accident such as an earthquake, a power-service interruption or a terror happening to such companies or such organizations and to allow the data to be recovered speedily should the data be damaged by such an accident.

In order to localize damage of such a disaster, normally, such data located at a particular site is copied to another site geographically separated from the particular site. Typically, the other site is separated from the particular site by a distance of several hundreds of kilometers. At each site, a host and a storage system such as a storage device for storing data are installed. A site is connected to another site by wide-area Ethernet or a wide-area network (WAN) such as the Internet. A storage device for storing master data is referred to as a master storage device. A host connected to a master storage device is referred to as a master host. A site at which a master storage device and a master host are installed is referred to as a master site. On the other hand, a storage device serving as a copy destination of data is referred to as a remote storage device. A host connected to a remote storage device is referred to as a remote host. A site at which a remote storage device and a remote host are installed is referred to as a remote site. An operation to copy data from a particular site to another site geographically separated from the particular site is referred to as a remote copy reproduction. A system implementing a remote copy reproduction is a remote copy reproduction system. A network port of a master storage device implementing remote copy reproduction is referred to as a master port. A network port of a remote storage device implementing remote copy reproduction is referred to as a remote port. A pair consisting of the address of a master port and the address of a remote port is referred to as a port pair.

A remote copy reproduction can be synchronous or asynchronous. In a synchronous remote copy reproduction, a write operation carried out by the master host is completed when the remote copy reproduction of write data is finished. In an asynchronous remote copy reproduction, on the other hand, a write operation carried out by the master host is completed when the master storage device saves the write data in a memory. Afterwards, the master host produces a remote copy of the data saved in the memory.

In order to prevent important data from being lost in an inter-site communication in a remote copy reproduction system, normally, a protocol such as the TCP/IP capable of assuring reliability is adopted in such an inter-site communication. To put it concretely, a transmission-side node holds a copy of transmitted data in a memory area dedicated for communications and, in order to assure reliability, the data is transmitted repeatedly till a acknowledgement notice is received from the reception-side node. The memory area dedicated for communications is a set of pages allocated by the remote copy reproduction system dedicatedly to the protocol of the network. In this case, a page is a fixed-length storage-area unit, which is obtained as a result of dividing a memory. The remote copy reproduction system executes a memory management function to divide a page into memory buffers each for storing data of a fixed amount. The memory buffers are cataloged on a free-buffer pool, which is a pool of available memory buffers. When the remote copy reproduction system receives a buffer allocation request, the remote copy reproduction system takes a memory buffer having a required size specified in the request out of the free-buffer pool, and allocates the memory buffer to a communication of the TCP connection or the like. If the sizes of the available memory buffers in the free-buffer pool are not sufficient for the required size, the remote copy reproduction system further divides an unallocated page into new memory buffers and catalogs the new memory buffers in the free-buffer pool as additional memory buffers. If the memory area dedicated for communications does not include an unallocated page anymore, the remote copy reproduction system finds out a new page from a memory resource of the remote copy reproduction system. If the remote copy reproduction system does not have an available memory resource, an error message indicating a memory deficit is issued. In the following description, the size of the free-buffer pool is referred to as an available-buffer size and a space of memory buffers allocated to a communication as buffers for holding a copy of transmitted data is referred to simply as a buffer.

The required size of this buffer is proportional to the latency and bandwidth of the network path. The latency of the network path is a period of time between a transmission of data from the transmission-side node and a reception of an acknowledgement notice from the reception-side node. Since the latency and the bandwidth vary from path to path, when a network path is changed in the course of a communication due to occurrence of a failure or the like, the latency of the network path also changes as well. In addition, the latency and bandwidth of a network path also vary in accordance with whether or not a load of a network device and communication traffic congestions exist on network paths. Since the latency and the bandwidth vary in the course of a communication as described above, as a result, the size of the buffer must also be changed as well during the communication.

If the size of the buffer is kept at a fixed value without regard to variations of the network path, there is raised a problem of deteriorating communication performance. That is to say, the amount of data that the transmission-side node is capable of transmitting without waiting for an acknowledgement notice cannot exceed the size or an available area of the buffer. Thus, for a small size of the buffer, the communication efficiency is also low as well. If the size of the buffer is excessively large, on the other hand, another problem is raised. That is to say, if the transmission-side device transmits data of an amount exceeding the data transmission power of the network path, a network device on the network path may destruct the data in some cases. If the data is destructed, the transmission-side node must retransmit the data, giving rise to a lower communication efficiency as a result. Thus, a technology is required as a technology for dynamically changing the size of the buffer in accordance with variations of the latency and bandwidth of the network path.

A technology for changing the size of the buffer in accordance with variations of the latency and bandwidth of the network path is disclosed in documents including Japanese Patent Laid-open No. 2002-208,981. In accordance with this technology, a pre-assigned-buffer size allocated to each connection is changed in dependence on the rate of utilization of the buffer assigned in advance. To put it in detail, when a connection is created, the maximum and minimum values of the size of a buffer assigned in advance to the connection as well as the maximum and minimum values of the utilization rate of the buffer are set. After communications through the connection are started, for each transmission/reception operation and/or periodically, the rate of utilization of the buffer assigned in advance to the connection is examined and an average rate of utilization is found. If the average rate of utilization exceeds the maximum value set for the rate of utilization but the size of a buffer assigned in advance to the connection is still smaller than the size maximum value, the size of the buffer is increased. If the average rate of utilization is lower than the minimum value set for the rate of utilization and the size of a buffer assigned in advance to the connection is still greater than the size minimum value, on the other hand, the size of the buffer is decreased. If the latency of a network path increases, the rate of utilization of the buffer assigned in advance to a connection for the network path also increases as well but, if the latency of a network path decreases, the rate of utilization of the buffer assigned in advance to a connection for the network path also decreases as well. Thus, the technology is capable of preventing the communication performance from deteriorating.

SUMMARY OF THE INVENTION

With the technology described above, however, a buffer with a required size cannot be allocated in some cases due to a deficit of a memory area provided for communications. An inability to allocate a buffer with a required size raises a problem particularly for a network path with a long latency requiring a buffer with a large size. As an example of this problem, the following description explains a case of the remote copy reproduction system described above. In this case, the master storage device carries out a remote copy reproduction communication with a remote storage device by using the same network interface as a disk I/O communication with the master host. If a large number of hosts carry out a disk I/O communication, the memory area dedicated for communications is used up exhaustively. Thus, at the start of the remote copy reproduction, a buffer for the remote copy reproduction communications cannot be allocated. As a result, the remote copy reproduction is discontinued. With the remote copy reproduction discontinued, if a large-scale accident occurs by any chance, important data is lost and the company or the organization incurs a big loss.

In addition, a problem also arises in a network path having a big change in latency. Assume for example that, while a master storage device is carrying out a remote copy reproduction in the remote copy reproduction system described above, the number of I/O operations with the master host increases so that the memory area dedicated for communications is used up exhaustively. Right after that, the size of the buffer can no longer be increased even if the latency of the network path for the remote copy reproduction lengthens. Thus, the transmission of data of the remote copy must be terminated. In the case of a synchronous remote copy reproduction, I/O processing carried out by the master host is ended when the remote copy reproduction is terminated. Even in the case of an asynchronous remote copy reproduction, if the halted state of the remote copy reproduction continues, data to be transmitted exhaustively occupies the memory of the master storage device so that I/O processing carried out by the master host must be ended. As a result, an application running in the master host interprets the termination of the I/O processing as an error, which causes the processing of a mainstay job to be discontinued.

Therefore, an improved technology of controlling the buffer is required.

According to an aspect of the present invention, there is provided a storage device communicating with a host computer and another storage device through a network. The storage device includes: an available buffer comprising a plurality of memory buffers; an in-use buffer comprising a plurality of memory buffers already allocated as memory buffers dedicated for communications; notification means for giving a notice of an available-buffer size to an external inquirer in response to an inquiry made by the external inquirer; buffer securing means for taking memory buffers having a reserved-buffer size specified in addition to a buffer-reservation target in a request made by an external requester as a request for a buffer reservation out of the available buffer and reserving the taken memory buffers as a reserved buffer for the buffer-reservation target in response to the request for a buffer reservation; allocation means for allocating the memory buffers of the reserved buffer to the buffer-reservation target to make them the in-use buffer in response to a request made by the external requester as a request to start an application; and execution means for executing the application communicating by using the in-use buffer allocated by the allocation means.

In accordance with the present invention, a reserved buffer is secured in advance. Thus, it is possible to avoid a buffer deficit in a communication carried out by using a target of a buffer reservation.

BRIEF DESCRIPTION OF THE DRAWINGS

FIGS. 3(a) and 3(b) are diagrams showing the data structure of a reserved-buffer information table and the data structure of a communication-path information table in the embodiment;

DETAILED DESCRIPTION OF THE INVENTION

Figure 1:
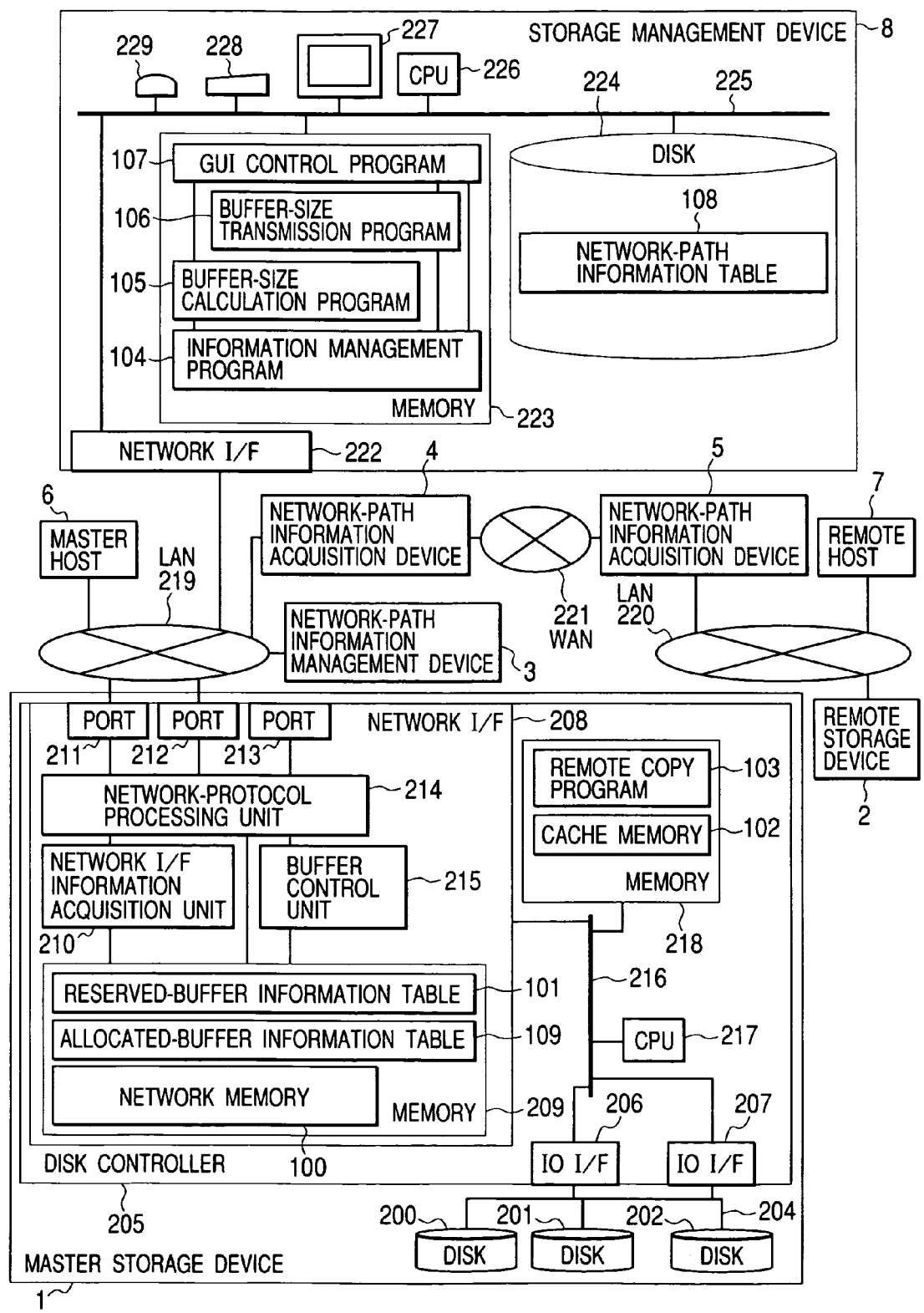
FIG. 1 is a diagram showing the configuration of a remote copy reproduction system implemented by a first embodiment.

Embodiments of the present invention will be described below by referring to the diagrams. Throughout the diagrams, identical components are identified by the same reference numeral.

FIG. 1 is a diagram showing the configuration of a remote copy reproduction system according to a first embodiment. The remote copy reproduction system has a master site and a remote site. The master site has configuration devices including a master storage device 1, a network-path information acquisition device 4, a network-path information management device 3, a master host 6 and a storage management device 8. The network-path information acquisition device 4 is a component for measuring information on network paths such as a bandwidth and a latency. The network-path information management device 3 is a component for collecting measured information on network paths from the network-path information acquisition device 4 and another network-path information acquisition device 5. The storage management device 8 is a management terminal of the master storage device 1. These configuration components are connected to each other by a LAN 219, which is typically a gigabit Ethernet.

On the other hand, the remote site has a remote storage device 2, the network-path information acquisition device 5 and a remote host 7, which are connected to each other by a LAN 220. The master site and the remote site are connected to each other by a WAN 221.

The master storage device 1 has secondary storage devices 200, 201 and 202, a disk controller 205 and an input/output (IO) bus 204 for connecting the disk controller 205 to the secondary storage devices 200, 201 and 202, which are referred to hereafter simply as disks 200, 201 and 202. The disk controller 205 is a component for controlling inputs and outputs to and from the disks 200, 201 and 202.

The disk controller 205 comprises a network interface (I/F) 208, a main storage device 218, a central processing unit 217, IO interfaces 206 and 207 and a communication line 216. The network interface 208 is a component for communicating with other device through the LAN 219. The main storage device 218 is referred to hereafter simply as a memory 218. The central processing unit 217 is abbreviated hereafter to a CPU 217. The IO interfaces 206 and 207 are each an interface with the IO bus 204. The communication line 216 is typically a bus, which is referred to hereafter as an internal bus. The memory 218 includes a cache memory 102 and a remote copy program 103. The cache memory 102 is a memory used for temporarily storing data read out from the disk 200, 201 or 202. The remote copy program 103 is an application program for reproducing a remote copy. The remote copy program 103 has been initially installed in the disk 200, 201 or 202 from a portable recording medium or downloaded from another device by way of the LAN 219 into the disk 200, 201 or 202 in advance. Then, if necessary, the remote copy program 103 is loaded into the memory 218 to be executed by the CPU 217.

The network interface 208 has a memory 209 including a network memory 100 and other areas used for storing a reserved-buffer information table 101 and an allocated-buffer information table 109. The reserved-buffer information table 101 is a table for managing reserved buffers. On the other hand, the allocated-buffer information table 109 is a table for managing already allocated buffers. The network interface 208 also has a network-interface-information acquisition unit 210, a network-protocol processing unit 214 and a buffer control unit 215, which can each be a piece of hardware or a program. The network-interface-information acquisition unit 210 is a component for examining the size of an unused area in the network memory 100. The buffer control unit 215 is a component for making a buffer reservation. The network-protocol processing unit 214 is a component for processing a communication with another device. In addition, the network interface 208 also includes ports 211, 212 and 213 connected to cables composing the LAN 219. Details of the network memory 100 will be described later.

The storage management device 8 comprises a network interface 222, a memory 223, a disk 224, a CPU 226, a output unit 227, a character input unit 228 and a pointing device 229, which are connected to each other by a internal bus 225. Referred to hereafter as a display unit, the output unit 227 is typically a display unit. The character input unit 228 is typically a keyboard. The pointing device 229 typically comprises a mouse and a touch panel. The memory 223 is a memory used for storing a information management program 104, a buffer-size calculation program 105, a buffer-size transmission program 106 and a graphical-user-interface control program 107. The information management program 104 is a program for storing information on a network path and information on a network interface into a table in the disk 224. The information on a network path and information on a network interface are obtained from the network-path information management device 3 and/or the master storage device 1. The buffer-size calculation program 105 is a program for computing the size of a buffer used in communications between ports of a port pair. The buffer-size transmission program 106 is a program for transmitting the size of a buffer to the memory 209 of the master storage device 1. The graphical-user-interface control program 107 is a program for displaying a GUI to be used by a person in charge of system management to carry out works. The person in charge of system management is referred to simply as a person in charge of system management. These programs have been initially installed in the disk 224 from a portable recording medium or downloaded from another device by way of the LAN 219 into the disk 224 in advance. Then, if necessary, any of the programs is loaded into the memory 223 to be executed by the CPU 226. The disk 224 is also used for storing a network-path information table 108 for holding various kinds of information on network paths between ports of a port pair. The network-path information table 108 can also be stored in the memory 223.

The remote storage device 2 basically has the same configuration and the same programs as the master storage device 1. The master host 6 and the remote host 7 are each the conventional host computer such as a server computer or a main frame.

Figure 2:
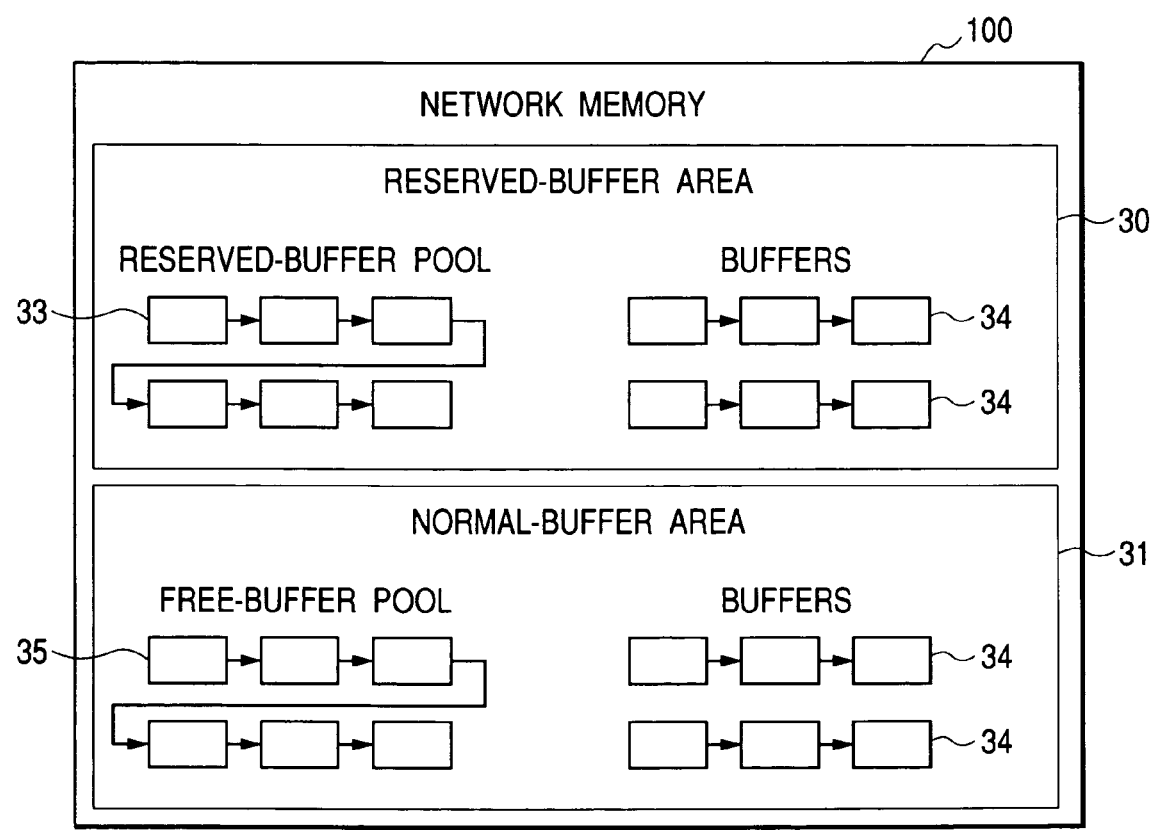
FIG. 2 is a diagram showing a data configuration of a memory area according to the embodiment as a memory area dedicated for communications.

FIG. 2 is a diagram showing a data configuration of the network memory 100. The network memory 100 comprises a normal buffer area 31 and a reserved-buffer area 30. The normal buffer area 31 is a conventional buffer space. The normal buffer area 31 comprises an in-use buffer 34 and a free-buffer pool 35. The free-buffer pool 35 is a pool of a plurality of available memory buffers. The in-use buffer 34 is actually a set of a plurality of memory buffers in use. On the other hand, the reserved-buffer area 30 is an additional buffer space according to the present invention. The reserved-buffer area 30 comprises an allocated buffer 34 and a reserved-buffer pool 33. Provided for each port pair, the reserved-buffer pool 33 is a pool of a plurality of reserved memory buffers. The allocated buffer 34 is actually a set of a plurality of memory buffers each already allocated as a memory buffer for a network interface. When a specific memory buffer included on the reserved-buffer pool 33 is allocated as a memory buffer for a communication, the specific memory buffer becomes a memory buffer of the allocated buffer 34. When a particular memory buffer included on the free-buffer pool 35 is used, the particular memory buffer becomes a memory buffer of the in-use buffer 34 in the normal buffer area 31 or a memory buffer of the reserved-buffer pool 33. Thus, there is no a partition separating the normal buffer area 31 from the reserved-buffer area 30. In the following description, the buffer 34 is the allocated buffer 34.

The reserved-buffer pool 33, the free-buffer pool 35 and the buffer 34 each comprises fixed-length memory buffers all having the same size. Each of the memory buffers has an address portion, a data portion and a chain portion. The address portion is used for storing the address of a memory location at the head of the data portion. The data portion is used for storing received data or data to be transmitted. The chain portion of any particular memory buffer is used for storing the memory address of a next memory buffer forming a buffer chain with the particular memory buffer. A buffer chain of memory buffers is formed for each port pair.

A buffer provided in the network memory 100 can be a credit for storing data transmitted by using a fibre channel protocol.

FIG. 3(a) is a diagram showing the data structure of the reserved-buffer information table 101. The reserved-buffer information table 101 is a table used for storing information on reserved buffers. Each record of the reserved-buffer information table 101 includes a master-port IP address 301, a remote-port IP address 302, a buffer address 303 and a reserved-buffer size 304. The master-port IP address 301 is the IP address of a master port. The remote-port IP address 302 is the IP address of a remote port for the master port. That is to say, these master and remote ports form a port pair. The buffer address 303 is the address of a memory buffer at the head of the reserved-buffer pool 33 provided for the port pair. The reserved-buffer size 304 is the total size of the reserved memory buffers. To be more specific, the reserved-buffer size 304 is the sum of the sizes of all memory buffers included in the reserved-buffer pool 33. For example, a record 305 includes a port pair consisting of a master-port IP address of 211.19.1.20 and a remote-port IP address of 133.185.12.20. The record 305 also includes a buffer address of 0x0FFFFF and a reserved-buffer size of 2.1 Mbytes. The buffer address is the address of the head memory buffer of the reserved-buffer pool 33 provided for the port pair whereas the reserved-buffer size is the total size of all reserved memory buffers on the reserved-buffer pool 33.

Each record of the allocated-buffer information table 109 shown in none of the figures has the same format as the reserved-buffer information table 101. That is to say, each record of the allocated-buffer information table 109 includes a master-port IP address, a remote-pot IP address, a buffer address and an allocated-buffer size. The buffer address is the address of a memory buffer at the head of the buffer 34. The allocated-buffer size is the sum of the sizes of all memory buffers included in the buffer 34.

FIG. 3(b) is a diagram showing the data structure of the network-path information table 108. The network-path information table 108 is a table used for storing pieces of information. Each piece of information is information on a network path between ports of a port pair. The information on a network path between ports of a port pair includes attributes of the network path between the ports of the port pair. The attributes include a latency, a bandwidth, a maximum number of sessions and a number of connections per session. Each record of the network-path information table 108 has a master-port IP address 401, a remote-port IP address 402, a bandwidth 403, a latency 404, a session count or number of sessions 405, and a connection count or number of connections 406. A master port indicated by the master-port IP address 401 and a remote port indicated by the remote-port IP address 402 forms a port pair. The bandwidth 403 is the amount of data transferred per unit time for the port pair. The latency 404 is a time period starting with a transmission of data between the ports of the port pair and ending with a reception of a notice to acknowledge the transmission. The session count 405 is the number of sessions that can be executed at the same time by the remote copy program 103 for the port pair. The connection count 406 is the number of TCP connections per session for the port pair. For example, a record 407 includes a port pair consisting of a master-port IP address of 211.19.1.20 and a remote-port IP address of 133.185.12.20. For this port pair, the useable bandwidth is 10 Mbps. The latency time that data takes to go back and forth along the network path of the port pair is 2.8 microseconds. The number of sessions is 2 and the number of connections per session is 3.

Figure 4A:
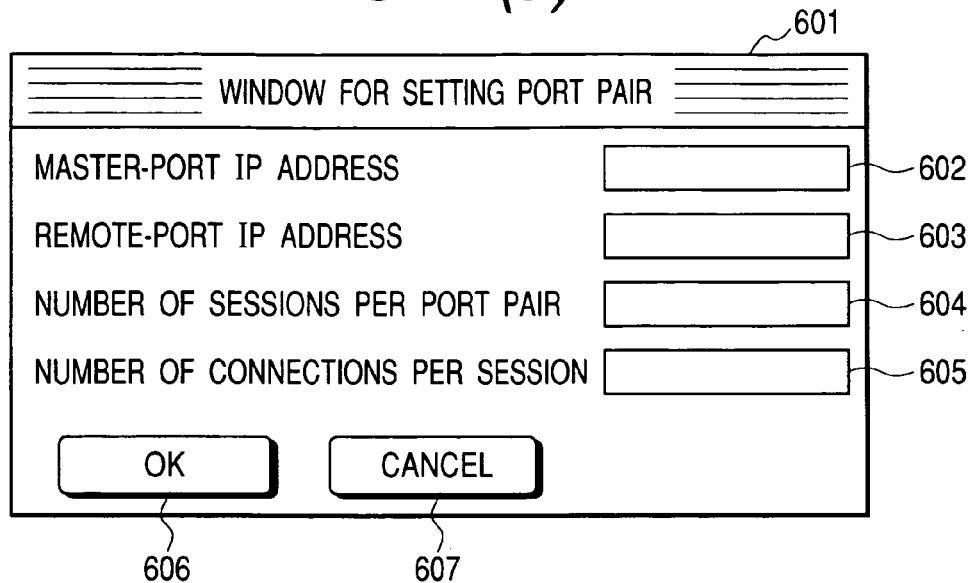
FIGS. 4(a) and 4(b) are diagrams showing a typical display configuration of a port-pair-setting window and a typical display configuration of a size specification window.
Figure 4B:
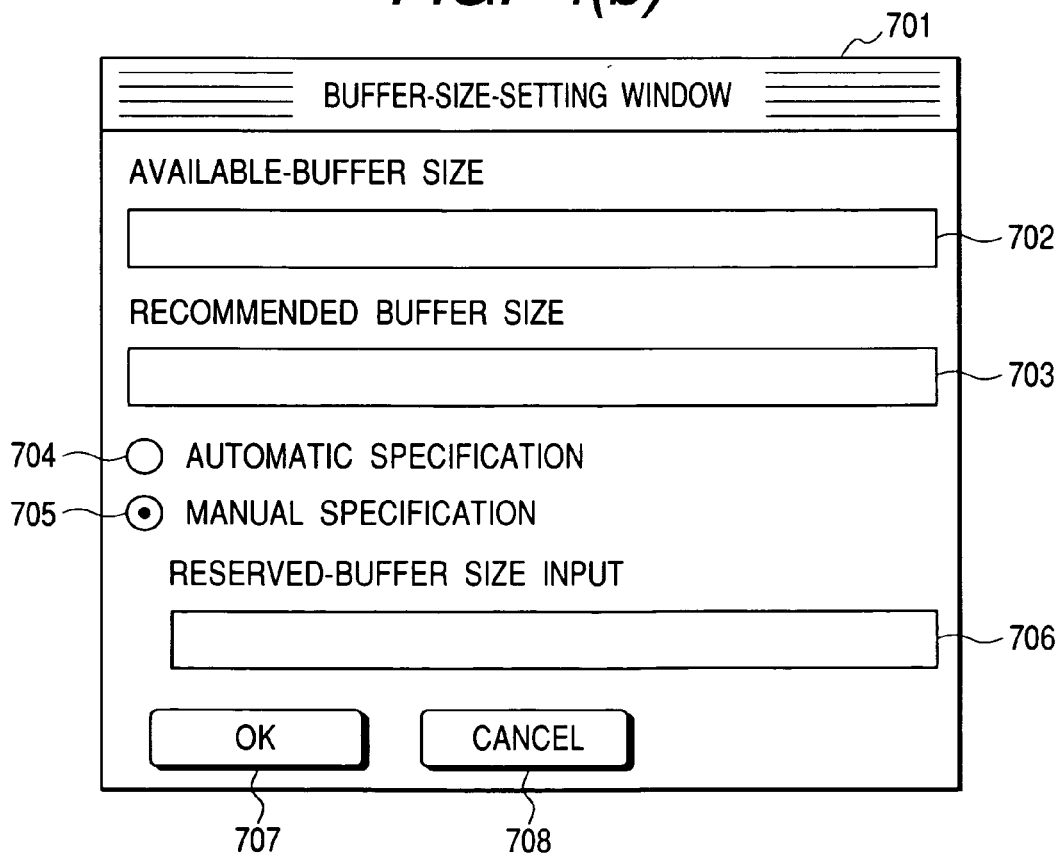

Next, a graphical user interface (GUI) used in the embodiment is explained by referring to FIGS. 4(a) and 4(b).

FIG. 4(a) is a diagram showing a typical display configuration of a port-pair-setting window 601 used by the person in charge of system management to catalog information on a port pair. That is to say, the person in charge of system management operates the character input unit 228 and the pointing device 229 to set a variety of parameters through this port-pair-setting window 601. The GUI control program 107 employed in the storage management device 8 displays this port-pair-setting window 601 on the display unit 227.

The port-pair-setting window 601 comprises input areas 602, 603, 604 and 605. The input area 602 is an area used for entering the IP address of the master port of the port pair. The input area 603 is an area used for entering the IP address of the remote port of the port pair. The input area 604 is an area used for entering the maximum number of remote copy reproduction sessions for the port pair. The input area 605 is an area used for entering the number of TCP connections per session. In addition, the port-pair-setting window 601 also includes an OK button 606 and a cancel button 607. The OK button 606 is a button operated to request the cataloging of port-pair information comprising these parameters. On the other hand, the cancel button 607 is a button operated to request cancellation of the operation to enter the information on the port pair.

FIG. 4(*b*) is a diagram showing a typical display configuration of a buffer-size-setting window 701 used by the person in charge of system management to specify a reserved-buffer size for the port pair. The buffer-size-setting window 701 is displayed by the graphical-user-interface control program 107 of the storage management device 8. The person in charge of system management operates the character input unit 228 and the pointing device 229 to set a variety of parameters through this port-pair-setting window 601.

The buffer-size-setting window 701 includes areas 702, 703 and 706 as well as buttons 704 and 705. The display area 702 is an area for displaying the size of an available buffer. The display area 703 is an area for displaying a recommended buffer size computed in a process to be described later. The button 704 is a button operated to select a feature to automatically specify the size of the buffer. The button 705 is a button operated to select a feature to manually specify the size of the buffer. The buffer-size input area 706 is an area used for entering the size of the buffer in case the manual specification has been selected.

In this case, the size of an available buffer is the size of an unused or unreserved buffer. Thus, the size of an available buffer is the total size of memory buffers included in the free-buffer pool 35. The recommended buffer size is the reserved-buffer size set for the port pair. If the feature to automatically specify the size of the buffer is selected, the storage management device 8 uses the recommended buffer size as the size of the buffer. If the person in charge of system management needs to enter the reserved-buffer size in accordance with importance to the port pair, the feature to manually specify the size of the reserved buffer is selected.

In addition, the buffer-size-setting window 701 also includes an OK button 707 and a cancel button 708. The OK button 707 is a button operated to request the cataloging of port-pair information comprising these parameters. On the other hand, the cancel button 708 is a button operated to request cancellation of the operation to enter the information on the port pair.

Figure 5:
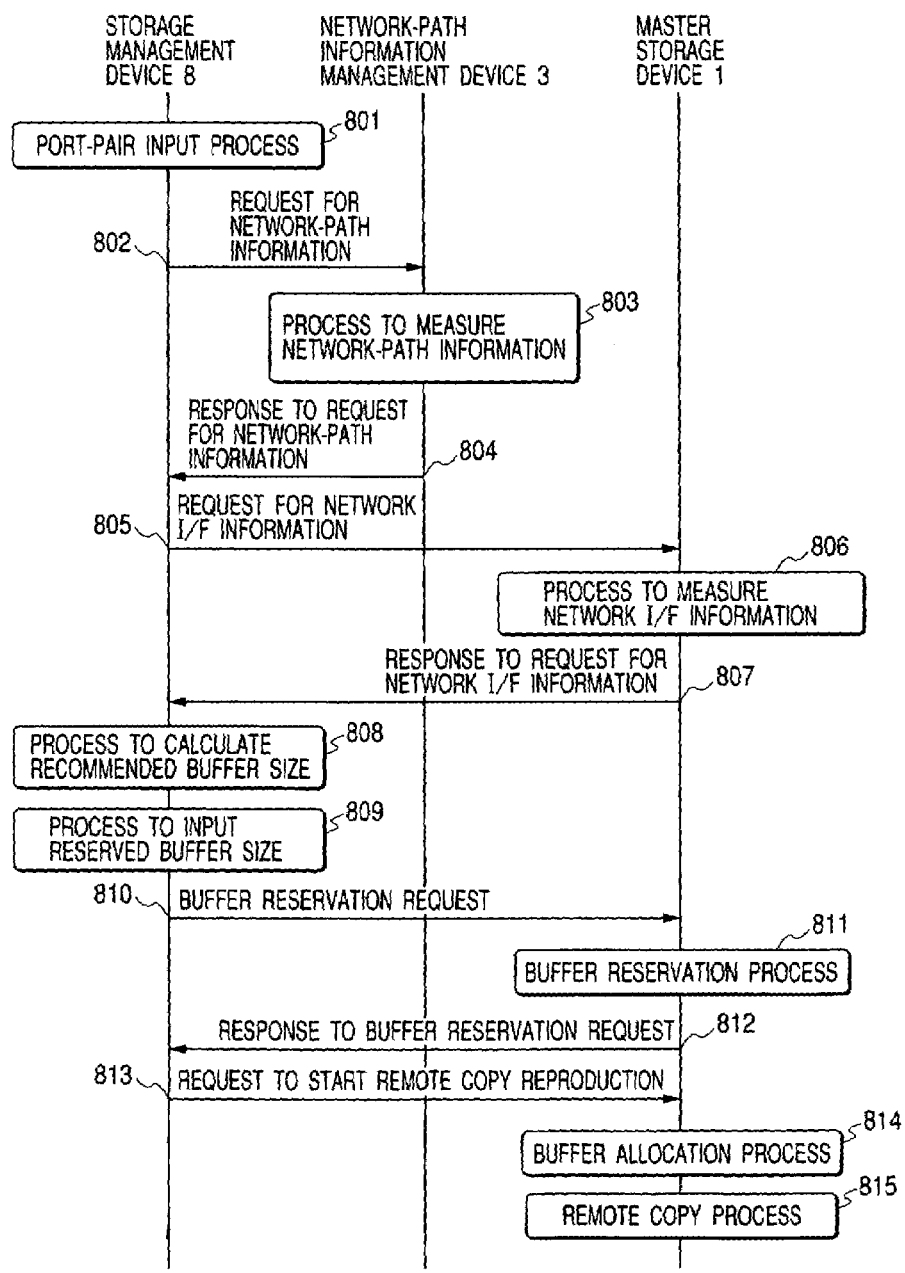
FIG. 5 is a diagram showing a processing procedure according to the first embodiment as a procedure ending with execution of a remote copy reproduction.

FIG. 5 is a diagram showing a processing procedure to start a remote copy reproduction of data from the master storage device 1 to the remote storage device 2 after the person in charge of system management reserves a buffer for the remote copy reproduction via the storage management device 8.

First of all, at a step 801, the person in charge of system management carries out an operation to start a remote copy reproduction through the graphical-user-interface control program 107 employed in the storage management device 8. In response to the operation, the graphical-user-interface control program 107 displays the port-pair-setting window 601 on the display unit 227. Then, when the person in charge of system management presses down the OK button 606 after entering information on a port pair by operating the character input unit 228, the pointing device 229 and other components, the graphical-user-interface control program 107 passes on the information on the port pair to the information management program 104. The information management program 104 receives the information on the port pair and adds a record based on the information on the port pair to the network-path information table 108.

Then, the information management program 104 collects information required for computation of a buffer size. First of all, at a step 802, the information management program 104 transmits a request specifying a specific port pair to the network-path information management device 3 as a request to acquire information on a network path for the specific port pair. Receiving the request to acquire information on a network path, at a step 803, the network-path information management device 3 carries out a process of measuring information on a network path in order to acquire the latency and bandwidth of the WAN 221 from the network-path information acquisition devices 4 and 5, and transmits a response including a result of acquisition to the information management program 104 in response to the request to acquire information on a network path. When receiving the response to the request to acquire information on a network path, at a step 804, the information management program 104 fetches the latency and bandwidth of the network path between the ports of the port pair from the response. Then, the information management program 104 searches the network-path information table 108 for a record by using the IP address assigned to the port pair as a key, setting the bandwidth and latency of the network path in the bandwidth 403 and latency 404 of the record found in the search.

Subsequently, at a step 805, the information management program 104 transmits a request specifying the port pair to the master storage device 1 as a request to acquire information on a network interface. Receiving this request to acquire information on a network interface, the network-interface-information acquisition unit 210 employed in the master storage device 1 carries out a process of measuring information on a network interface in order to examine the size of an available buffer in the network memory 100 employed in the master storage device 1 at a step 806. The network-interface-information acquisition unit 210 then transmits a response including the size of an available buffer as a result of the measurement process to the storage management device 8 in response to the request to acquire information on a network interface. When receiving the response to the request to acquire information on a network interface, at a step 807, the information management program 104 employed in the storage management device 8 fetches the size of an available buffer from the response and saves the available-buffer size in the memory 223. The procedure executed at the steps 805, 806 and 807 to acquire information on a network interface can also be executed prior to the procedure executed at the steps 802, 803 and 804 to acquire information on a network path.

Then, at a step 808, the buffer-size calculation program 105 is executed to compute a recommended buffer size to be described later. The graphical-user-interface control program 107 receives the results of the processing and displays the result on the aforementioned buffer-size-setting window 701 of the display unit 227. To be more specific, the display area 702 on the buffer-size-setting window 701 displays the buffer size obtained at the step 807 as the size of an available buffer. On the other hand, the display area 703 of the buffer-size-setting window 701 displays the result of the computation process carried out by the buffer-size calculation program 105 at the step 808 as the recommended buffer size.

When the person in charge of system management presses down the OK button 707, the graphical-user-interface control program 107 informs the buffer-size information transmission program 106 of the reserved-buffer size at a step 809. If the person in charge of system management has selected the automatic-specification button 704, the recommended buffer size computed at the step 808 is used as the reserved-buffer size. If the person in charge of system management has selected the manual-specification button

705, on the other hand, a buffer size entered by the person in charge of system management to the buffer-size input area 706 is used as the reserved-buffer size. If the person in charge of system management enters 0, a negative number or a number greater than the size of an available buffer, however, the graphical-user-interface control program 107 clears the buffer-size input area 706 and issues a warning to prompt the person in charge of system management to reenter a new reserved-buffer size.

When receiving the reserved-buffer size, at a step 810, the buffer-size information transmission program 106 transmits a request including this reserved-buffer size and the port pair entered by the person in charge of system management to the port-pair-setting window 601 to the master storage device 1 as a request for a buffer reservation.

When the master storage device 1 receives this request for a buffer reservation, at a step 811, the buffer control unit 215 carries out a buffer reservation process to be described later. Then, after carrying out the buffer reservation process, at the next step 812, the buffer control unit 215 transmits a response to the request for a buffer reservation to the storage management device 8.

When receiving the response to the request for a buffer reservation, the storage management device 8 carries out the buffer reservation. After the buffer reservation is completed, at a step 813, the information management program 104 transmits a request specifying the port pair for each connection in every session to the remote copy program 103 as a request to initiate a remote copy reproduction. It is to be noted that, at that time, the information management program 104 completes the processing for the time being. Some time later, the information management program 104 may transmit a request to start a remote copy reproduction automatically or manually.

When receiving the request to start a remote copy reproduction, the remote copy program 103 fetches the IP addresses of the port pair from the request, and issues a request including the port pair to the network-protocol-processing unit 214 as a request to allocate a buffer. Receiving the request to allocate a buffer, at a step 814, the network-protocol-processing unit 214 carries out a buffer allocation process to be described later and informs the remote copy program 103 of the start address of the allocated buffer 34. When informed of this start address of the allocated buffer 34, at the next step 815, the remote copy program 103 is executed to carry out a remote copy reproduction process in accordance with the conventional technology by using the address. The foregoing describes the sequence of the process carried out when the remote copy is started.

Figure 6:
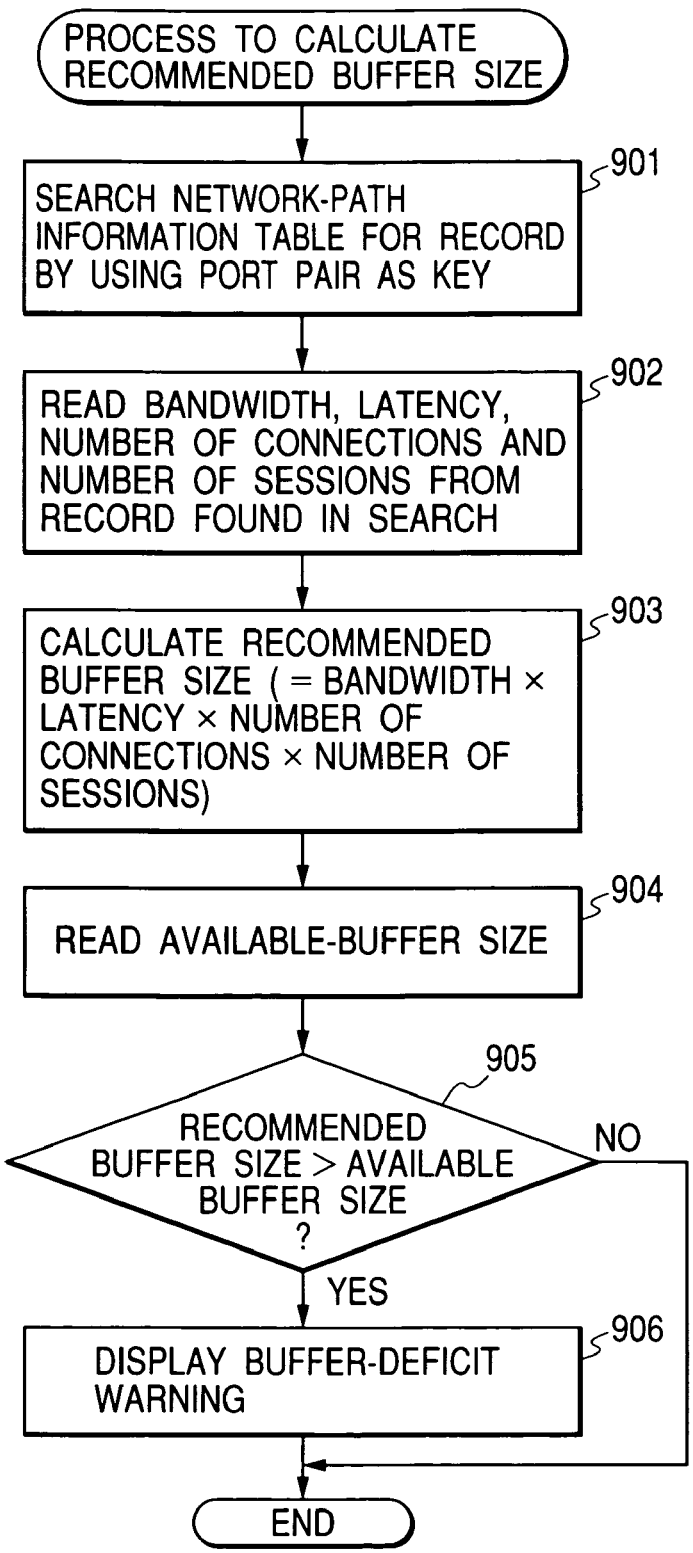
FIG. 6 shows a flowchart representing the procedure of a process according to the embodiment as a process to compute a recommended buffer size.

By referring to a flowchart shown in FIG. 6, the following description explains operations of a process carried out to compute a recommended buffer size by execution of the buffer-size calculation program 105. The flowchart begins with a step 901 at which the buffer-size calculation program 105 searches the network-path information table 108 for a record by using the IP addresses of a port pair as a key. The IP address has been entered by the person in charge of system management by using the port-pair-setting window 601. Then, at the next step 902, the buffer-size calculation program 105 fetches a bandwidth 403, a latency 404, a session count 405 and a connection count 406 from the record found in the search. Subsequently, at the next step 903, the buffer-size calculation program 105 computes a product of all the bandwidth 403, the latency 404, the session count 405 and the connection count 406, taking the product as a recommended buffer size. Then, at the next step 904, the buffer-size calculation program 105 reads out the size of an available buffer from the memory 223. The size of an available buffer has been obtained at the step 807. Subsequently, at the next step 905, the buffer-size calculation program 105 compares the recommended buffer size with the size of an available buffer. If the size of an available buffer is greater than the recommended buffer size, the process is ended without a problem. If the size of an available buffer is smaller than the recommended buffer size, on the other hand, the flow of the process goes on to a step 906 at which a warning of a memory deficit is issued before the process is ended.

Figure 7:
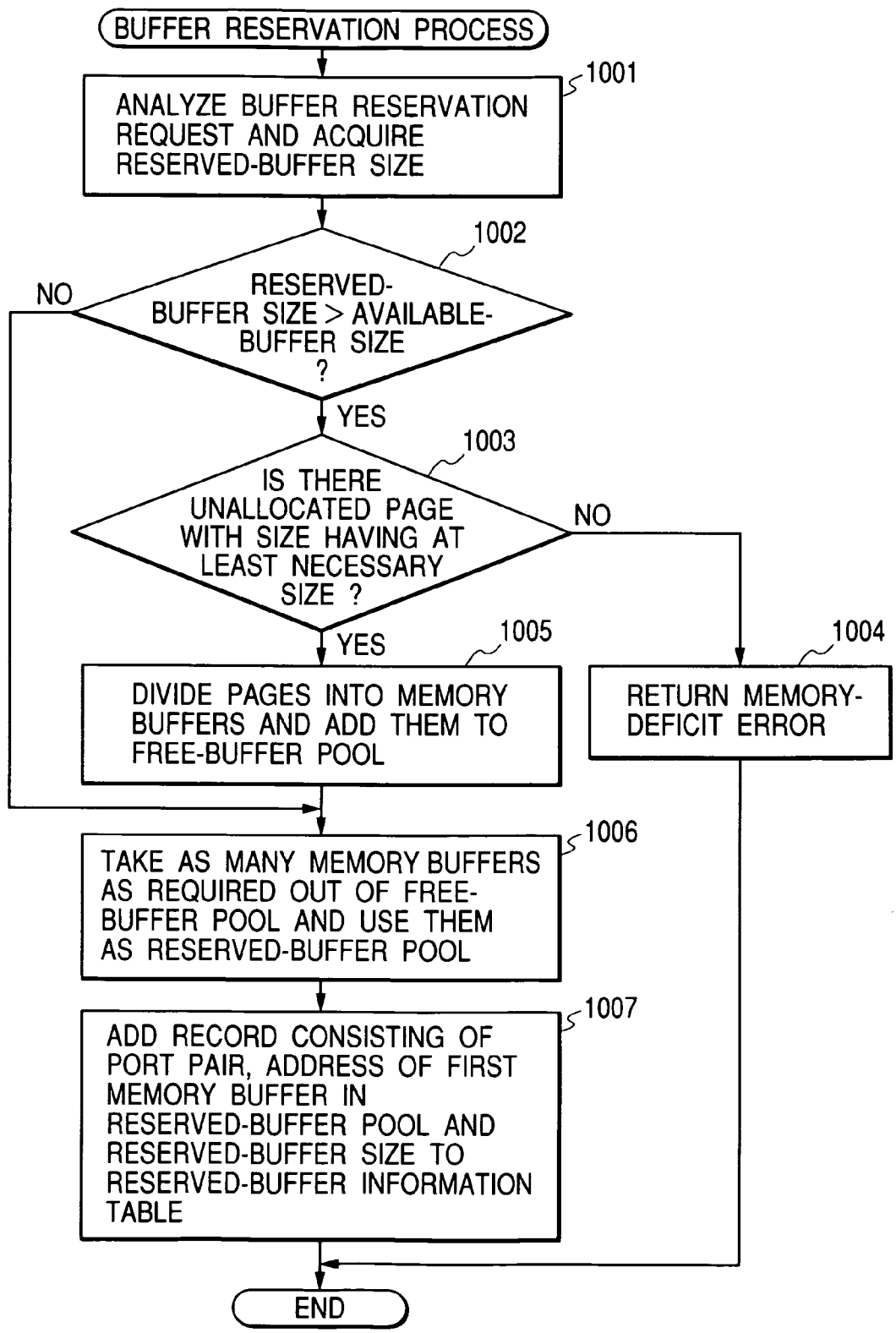
FIG. 7 shows a flowchart representing the procedure of a process according to the embodiment as a process to make a buffer reservation.

By referring to a flowchart shown in FIG. 7, the following description explains operations of a process carried out by the buffer control unit 215 to make a buffer reservation. The flowchart begins with a step 1001 at which the buffer control unit 215 analyzes a request for a buffer reservation, fetches out the size of a buffer to be reserved from the request and acquires the size of an available buffer. Then, at the next step 1002, the buffer control unit 215 compares the size of a buffer to be reserved with the size of an available buffer. If the size of an available buffer is at least equal to the size of a buffer to be reserved, the flow of the process goes on to a step 1006. If the size of an available buffer is smaller than the size of a buffer to be reserved, on the other hand, the flow of the process goes on to a step 1003 at which the buffer control unit 215 determines whether or not an undivided page having at least a required size exists. The required size is the difference between the size of an available buffer and the size of a buffer to be reserved. The undivided page is a page included in the memory as a page other than the network memory 100. If an undivided page having the required size exists, the flow of the process goes on to a step 1005 at which the page is divided into memory-buffer units and the memory-buffer units are added to the free-buffer pool 35. If the size of the undivided page is not sufficient, on the other hand, the flow of the process goes on to a step 1004 at which the buffer control unit 215 transmits a response indicating a memory-deficit error to the storage management device 8 in response to the request to make a buffer reservation.

Then, at a step 1006, the buffer control unit 215 fetches a memory buffer with the required size from the free-buffer pool 35 and puts the memory buffer on the reserved-buffer pool 33. Then, at the next step 1007, the buffer control unit 215 creates a record and adds the record to the reserved-buffer information table 101. The record comprises the IP addresses of the port pair, the address of a memory buffer at the head of the reserved-buffer pool 33 and the size of a buffer to be reserved. Finally, the process is ended. It is to be noted that, if the record for the port pair already exists on the reserved-buffer pool 33, the reserved-buffer size is updated.

Figure 8:
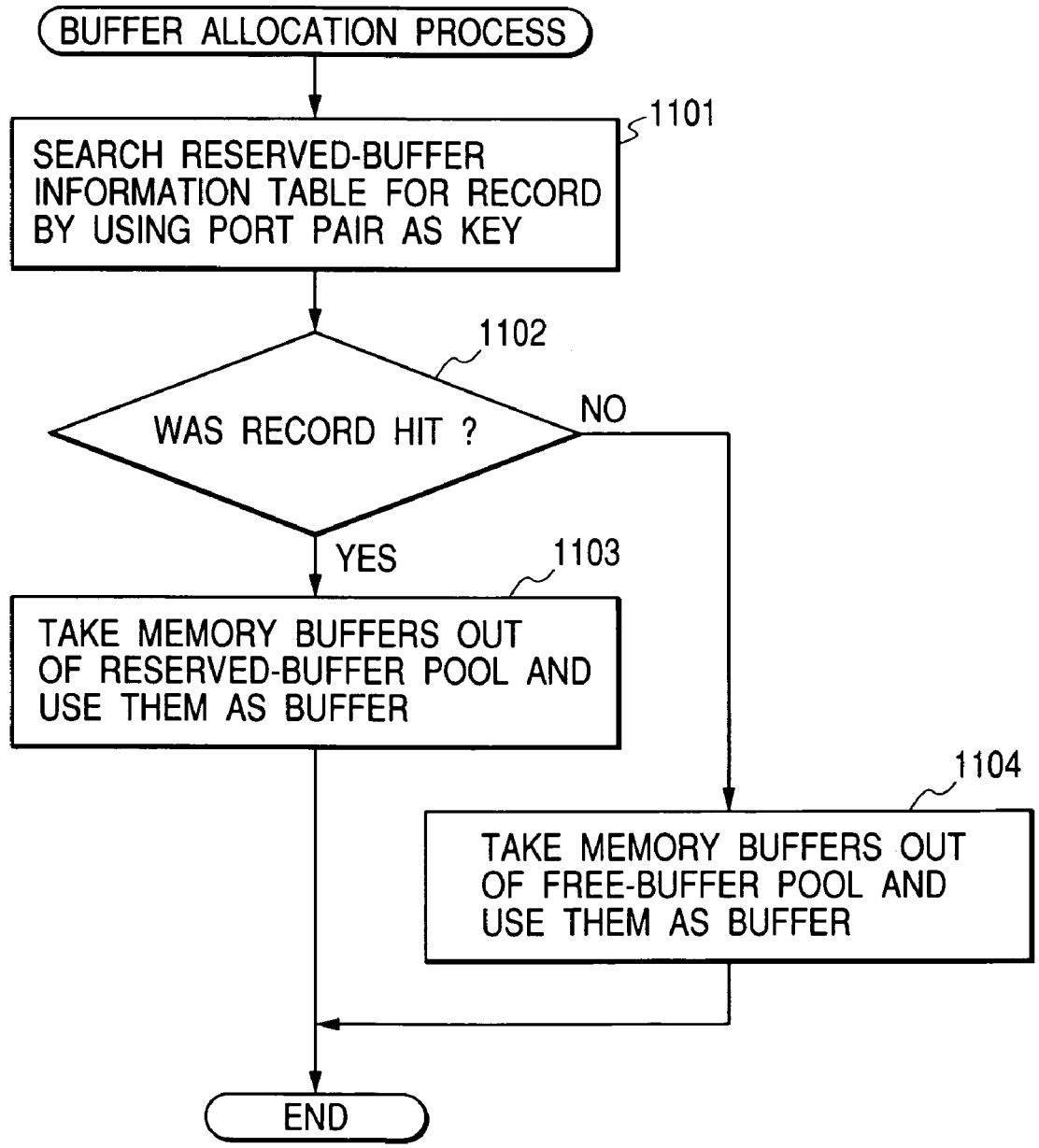
FIG. 8 shows a flowchart representing the procedure of a process according to the embodiment as a process to allocate a buffer.

By referring to a flowchart shown in FIG. 8, the following description explains operations of a process carried out by the network-protocol processing unit 214 to allocate a buffer. The flowchart begins with a step 1101 at which the network-protocol processing unit 214 fetches the IP addresses of a port pair from a received request to allocate a buffer and uses the port pair as a key in an operation to search the reserved-buffer information table 101 for a record. If a record is found in the search operation, that is, if a determination result obtained at the next step 1102 is YES, a memory buffer is determined to have been reserved for communications between the ports of the pair port. In this case, the flow of the process goes on to a step 1103 at which the network-protocol processing unit 214 fetches a buffer address 303 from the record. Then, a predetermined number of memory buffers are taken from the reserved-buffer pool 33 starting at the buffer address 303 and concatenated to form a buffer 34. The network-protocol processing unit 214 then allocates the buffer 34 to an application originating the request. To put it concretely, the network-protocol processing unit 214 allocates the buffer 34 to the remote copy program 103. Finally, the network-protocol processing unit 214 ends the process.

It is to be noted that, for the allocated buffer 34, the IP address of the port pair, the buffer address of the buffer 34 and the buffer size are cataloged in the allocated-buffer information table 109. If a buffer has already been allocated to the port pair, a buffer with a specific reserved-buffer size subtracted from the reserved-buffer size 304 is additionally allocated. The specific reserved-buffer size is a difference between the necessary size of a buffer to be allocated at the request to allocate a buffer and the size of the already allocated buffer. Then, the buffer address and allocated-buffer size of the allocated-buffer information table 109 are updated. The upper limit of the size of the allocated buffer is the size of the reserved buffer. A request of buffer allocation exceeding the size of the reserved buffer is refused.

If the determination result obtained at the step 1102 is NO meaning that a record is not found in the search operation, on the other hand, no memory buffer is determined to have been reserved for communications between the ports of the pair port. In this case, the flow of the process goes on to a step 1104 at which the network-protocol-processing unit 214 takes a predetermined number of memory buffers from the free-buffer pool 35 and concatenates the memory buffers to form a buffer 34. The network-protocol processing unit 214 then allocates the buffer 34 to an application originating the request. Finally, the network-protocol processing unit 214 ends the process. It is to be noted that, for the allocated buffer 34, a new record is cataloged in the allocated-buffer information table 109 or a record already existing in the allocated-buffer information table 109 is updated in the same way as the one described above. It is also worth noting that the number of memory buffers taken from the reserved-buffer pool 33 or the free-buffer pool 35 is set for each network interface 208 by the person in charge of system management.

This embodiment assumes that, during execution of the conventional remote copy reproduction process, the size of an allocated buffer is changed in accordance with changes of the latency and bandwidth of the network path by adoption of a method provided by the conventional technology.

In addition, this embodiment also assumes that the TCP/IP is used as a network protocol. However, the present invention is also effective even if another protocol such as the Fibre Channel protocol is adopted.

The first embodiment has been described so far. In the first embodiment, prior to the start of a remote copy reproduction, a buffer having a size required for communications in the remote copy reproduction is reserved in a memory area dedicated for communications. Thus, the memory area dedicated for communications can be prevented from becoming insufficient due to an increased number of communications with the host. As a result, it is possible to prevent the remote copy reproduction from being suspended and a mainstay job from being stopped.

Next, a second embodiment is described by explaining only differences between the first and second embodiments. The second embodiment implements a method to update the size of a buffer in accordance with a change in information on a network path in the course of a remote copy reproduction in a remote copy reproduction system similar to that implemented by the first embodiment.

Figure 9:
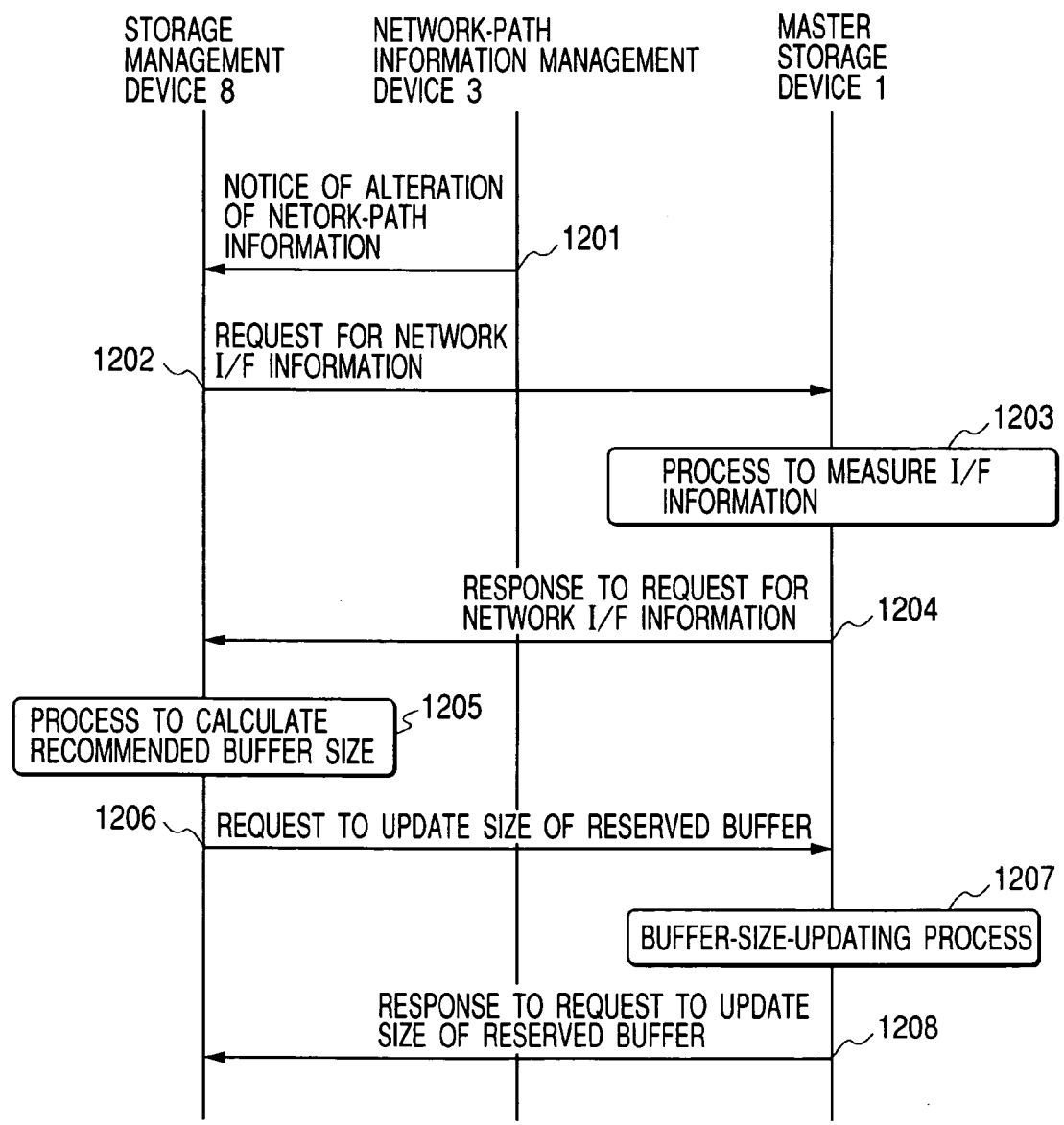
FIG. 9 is a diagram showing a processing procedure according to a second embodiment as a procedure ending with an operation to update a buffer size.

FIG. 9 is a diagram showing the procedure of processing to update the size of a reserved buffer for a remote copy reproduction, which is carried out by the master storage device 1 after the storage management device 8 re-computes the recommended buffer size upon reception of a notice of a change in information on a network path from the network-path information management device 3.

When the network-path information management device 3 collecting information on a network path of the WAN 221 between ports of a port pair from the network-path-information acquisition devices 4 and 5 detects a change of the bandwidth and/or latency of the network path while the master storage device 1 is carrying out a remote copy reproduction between the ports, the network-path information management device 3 transmits a notice of the change in information on the network path to the storage management device 8 at a step 1201. The notice includes the IP addresses of the port pair and the new bandwidth and latency of the network path between the ports of the port pair. The change in bandwidth and/or latency is caused typically by a communication traffic congestion occurring on the network path or a path changeover due to a failure.

When the storage management device 8 receives the notice of the change in information on the network path, the information management program 104 fetches the IP addresses of the port pair, the bandwidth and the latency from the notice, and updates a record included in the network-path information table 108 as a record provided for the port pair. Then, at a step 1202, the information management program 104 transmits a request specifying the port pair to the master storage device 1 as a request to acquire information on a network interface. When the master storage device 1 receives the request to acquire information on a network interface, the network-interface-information acquisition unit 210 examines the size of an available buffer in the network memory 100. In addition, the network-interface-information acquisition unit 210 searches the allocated-buffer information table 109 for a record provided for the port pair, and fetches the size of an allocated buffer from the record at a step 1203. Then, at the next step 1204, the network-interface-information acquisition unit 210 transmits a response including the available-buffer size and the size of the allocated buffer to the storage management device 8 as a response to the request to acquire information on a network interface. When the storage management device 8 receives the response to the request to acquire information on a network interface, the information management program 104 stores the available-buffer size and the allocated-buffer size, which are included in the response, in the memory 223.

Subsequently, at a step 1205, the buffer-size calculation program 105 carries out the recommended-buffer-size calculation process described before to compute a recommended buffer size. It is to be noted that, in this case, the recommended-buffer-size calculation process is carried out by changing the comparison relation of the step 905 to "(Recommended buffer size−allocated-buffer size)>Available-buffer size?".

Then, at the next step 1206, the information management program 104 transmits a request specifying the port pair and the computed recommended buffer size to the master storage device 1 as a request to update the size of a reserved buffer. When the master storage device 1 receives the request to update the size of a reserved buffer, at a step 1207, the buffer control unit 215 carries out a reserved-buffer-updating process to be described later. After ending the process to update the size of a reserved buffer, the buffer control unit 215 transmits a response to the request to update the size of a reserved buffer to the storage management device 8 at the next step 1208.

Figure 10:
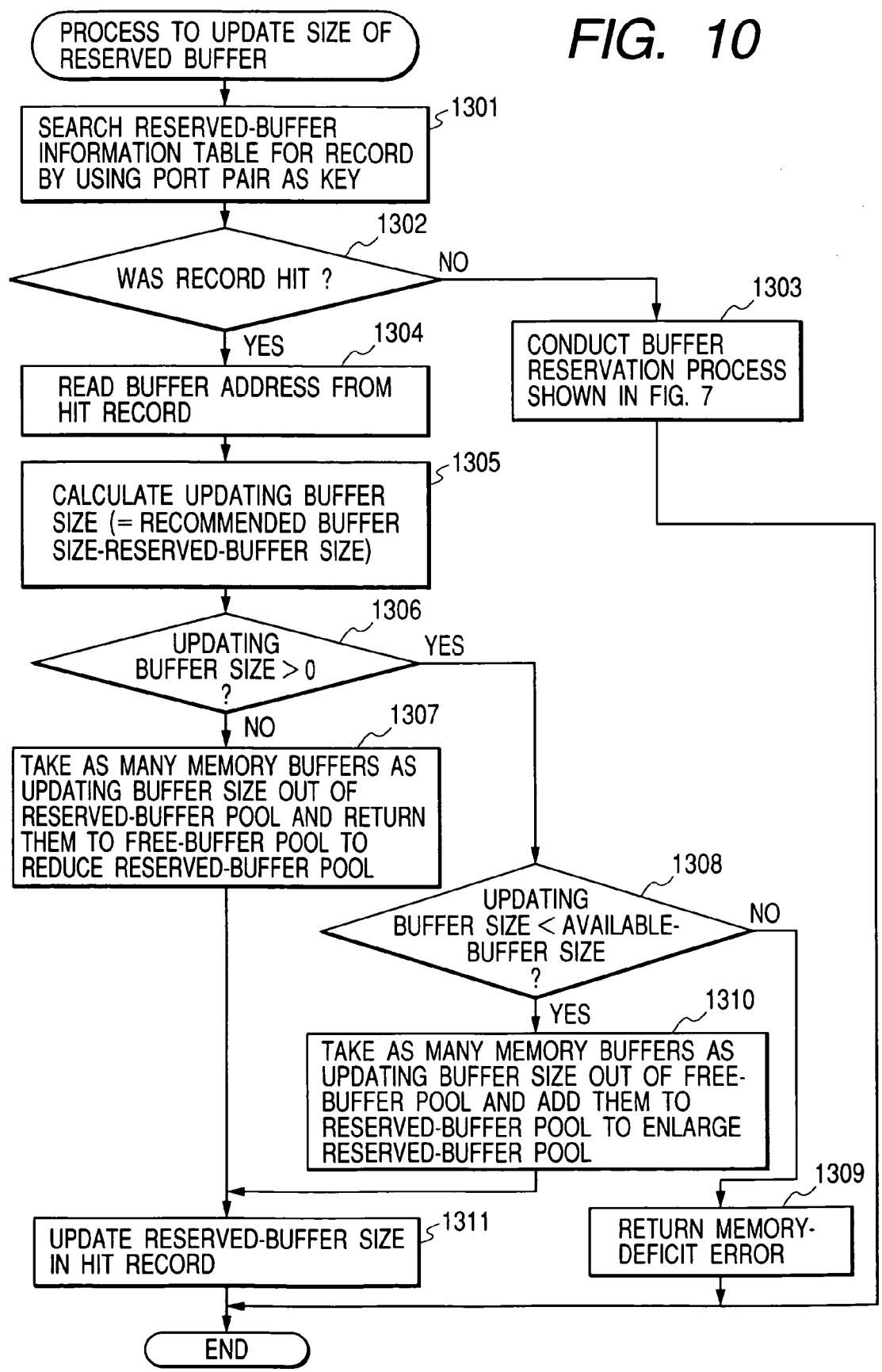
FIG. 10 shows a flowchart representing the procedure of a process according to the second embodiment as a process to update a buffer size.

By referring to a flowchart shown in FIG. 10, the following description explains operations of a process carried out by the buffer control unit 215 to update the size of a reserved buffer. It is to be noted that, a port pair and a recommended-buffer size, which are included in the request made at the step 1206 as a request to update the size of a reserved buffer, are used as inputs. The flowchart begins with a step 1301 at which the buffer control unit 215 searches the reserved-buffer information table 101 for a record by using the IP addresses of the port pair as a key. If a record is not found in the search, that is, if the determination result obtained at a step 1302 is NO, the flow of the process goes on to a step 1303 at which the buffer-reserving process represented by the flowchart shown in FIG. 7 is carried out. Then, this process to update the size of a reserved buffer is finished.

If a record is found in the search, that is, if the determination result obtained at a step 1302 is YES, on the other hand, the flow of the process goes on to a step 1304 at which the buffer address 303 and reserved-buffer size 304 of the reserved buffer are fetched from the record. Then, at the next step 1305, an updating buffer size is computed by subtracting the reserved-buffer size from the recommended buffer size.

If the updating buffer size is greater than 0, that is, if the determination result obtained at a step 1306 is YES, the flow of the process goes on to a step 1308 to compare the updating buffer size with the available-buffer size. If the updating buffer size is at least equal to the available-buffer size, that is, if the determination result obtained at a step 1308 is NO, the flow of the process goes on to a step 1309 at which a response indicating a memory-deficit error is transmitted to the storage management device 8 as a response to the request to update a reserved buffer. Then, this process is finished. If the updating buffer size is smaller than the available-buffer size, that is, if the determination result obtained at a step 1308 is YES, on the other hand, the flow of the process goes on to a step 1310 at which memory buffers having a total size equal to the updating buffer size are obtained from the free-buffer pool 35 and linked with the reserved-buffer pool 33 to increase the size of the reserved-buffer pool 33.

If the updating buffer size is smaller than 0, that is, if the determination result obtained at a step 1306 is NO, on the other hand, the flow of the process goes on to a step 1307 at which memory buffers having a total size equal to the updating buffer size are obtained from the reserved-buffer pool 33 and linked with the free-buffer pool 35. In this way, the size of the reserved-buffer pool 33 is decreased.

Then, after the size of the reserved-buffer pool 33 is changed as described above, at a step 1311, the reserved-buffer size 304 of the reserved-buffer information table 101 is updated to the recommended buffer size. Finally, this process is finished.

The second embodiment has been described above. In the second embodiment, the storage management device changes the reserved-buffer size of the master storage device 1 so that it is possible to avoid a buffer deficit in the event of a path changeover caused by a communication-traffic congestion or a failure occurring in the course of a remote copy reproduction.

Next, a third embodiment is described by explaining only differences between the third and first embodiments as well as differences between the third and second embodiments. The third embodiment allows a buffer to be reserved for a combination consisting of a port pair and a remote-site port number in a remote copy reproduction system similar to that implemented by the first embodiment.

A port number of a remote site is a sub-address added to the IP address of the remote storage device. A port number is a number indicating an application layer of the remote storage device indicated by the IP address as an application layer, the protocol of which is used for carrying out a TCP/IP communication. An example of a combination consisting of a port pair and a remote-site port number is a set consisting of a master-port IP address of 211.19.1.20, a remote-port IP address of 0.133.185.12.20 and a remote-site port number of 25.

First of all, data structures of the third embodiment are described by explaining only their differences from those of the first embodiment. In the case of the third embodiment, a column for storing port numbers of remote sites is added to the reserved-buffer information table 101 shown in FIG. 3A, the allocated-buffer information table 109 having the same format as the reserved-buffer information table 101 and the network-path information table 108 shown in FIG. 3(*b*).

Then, the GUI of the third embodiment is described by explaining only their differences from that of the first embodiment. In the case of the third embodiment, the graphical-user-interface control program 107 displays a buffer-reservation-target-setting window 1401 shown in FIG. 11. The buffer-reservation-target-setting window 1401 includes input areas 1402, 1403, 1404, 1405 and 1406. The input area 1402 is an area for entering the IP address of a master port. The input area 1403 is an area for entering the IP address of a remote port. The input area 1404 is an area for entering a port number of the remote site. The input area 1405 is an area for entering the number of sessions per combination consisting of a port pair and a port number. The input area 1406 is an area for entering the number of connections per session. In addition, the buffer-reservation-target-setting window 1401 also includes an OK button 1407 and a cancel button 1408. The OK button 1407 is a button operated to request the cataloging of the inputs described above. On the other hand, the cancel button 1408 is a button operated to request cancellation of the operation to enter the inputs. A window used by the person in charge of system management to specify the reserved-buffer size for the port pair is the same as the window shown in FIG. 4(*b*) for the first embodiment.

Next, processing procedures of the third embodiment are described by explaining only their differences from those of the first and second embodiments.

First of all, for the processing procedure represented by the flowchart shown in FIG. 5, differences from the first embodiment are explained below. In the case of the third embodiment, at the step 801 of the flowchart shown in FIG. 5, the buffer-reservation-target-setting window 1401 is displayed. The steps 802 to 809 are the same as those of the first embodiment.

At the step 810, the buffer-size information transmission program 106 adds a port number of the remote site to information specified in the buffer reservation request transmitted to the master storage device 1. The steps 811 and 812 are the same as those of the first embodiment.

At the step 813, the information management program 104 adds the port number of the remote site to information specified in a request transmitted to the remote copy program 103 as a request to start a remote copy reproduction. At the step 814, the remote copy program 103 adds the remote-site port number included in information fetched from the request to start a remote copy reproduction to information specified in a buffer allocation request transmitted to the network-protocol processing unit 214. The rest is the same as the first embodiment. The step 815 is the same as the first embodiment. The above description explains all the differences from the processing procedure represented by the flowchart shown in FIG. 5.

Then, for the recommended-buffer-size calculation process represented by the flowchart shown in FIG. 6, differences from the first embodiment are explained below. In the case of the third embodiment, at the step 901 of the flowchart shown in FIG. 6, a port number of the remote site is added to information used as a key in an operation carried out by the buffer-size calculation program 105 to search the network-path information table 108 for a record. The step 902 and the subsequent steps are the same as those of the first embodiment.

Next, for the buffer reservation process represented by the flowchart shown in FIG. 7, differences from the first embodiment are explained below. The steps 1001 to 1006 for the third embodiment are the same as those of the first embodiment. The buffer control unit 215 adds a port number of the remote site to information to be cataloged in the reserved-buffer information table 101 at the step 1007 as a record.

Next, for the buffer allocation process represented by the flowchart shown in FIG. 8, differences from the first embodiment are explained below. In the case of the third embodiment, at the step 1101 of the flowchart shown in FIG. 8, the network-protocol processing unit 214 adds a port number of the remote site to information fetched from a received buffer allocation request and information used as a key in an operation to search the reserved-buffer information table 101 for a record. The steps 1102 to 1104 are the same as the first embodiment except that the port number of the remote site is added to information cataloged in the allocated-buffer information table 109 and a combination consisting of the port pair and the port number of the remote site is used as a substitute for the port pair in the description of these steps.

Next, for the processing procedure represented by the flowchart shown in FIG. 9, differences from the second embodiment are explained below. The step 1201 for the third embodiment is the same as that of the second embodiment.

At the steps 1202 to 1208, first of all, the information management program 104 fetches a port pair, a bandwidth and a latency from a received notice of a change in information on a network path, searches the network-path information table 108 for records by using the port pair as a key and replaces the bandwidth 403 and latency 404 of each of the records found in the search with respectively the bandwidth and latency fetched from the notice of a change in information on a network path. Then, for the records found in the search, the following processing is carried out. First of all, at the step 1202, the information management program 104 transmits a request to acquire information on a network interface to the master storage device 1. The request to acquire information on a network interface specifies the port pair and the port number of the remote site. When the master storage device 1 receives the request to acquire information on a network interface, the network-interface-information acquisition unit 210 examines the size of an available buffer in the network memory 100. In addition, the network-interface-information acquisition unit 210 searches the allocated-buffer information table 109 for a record, and fetches the size of an allocated buffer from the record at a step 1203. Then, at the next step 1204, the network-interface-information acquisition unit 210 transmits a response to the request to acquire information on a network interface to the storage management device 8. When the storage management device 8 receives the response to the request to acquire information on a network interface, the buffer-size calculation program 105 is executed to carry out the aforementioned recommended-buffer-size calculation process to obtain the recommended buffer size at the step 1205.

Then, at the next step 1206, the information management program 104 transmits a request specifying the port pair, the port number of the remote site and the computed recommended buffer size to the master storage device 1 as a request to update the size of the reserved buffer. When the master storage device 1 receives the request to update the size of the reserved buffer, at a step 1207, the buffer control unit 215 carries out a reserved-buffer-updating process to be described later. After ending the process to update the size of the reserved buffer, the buffer control unit 215 transmits a response to the request to update the size of the reserved buffer to the storage management device 8 at the next step 1208. The processing of the steps 1202 to 1208 is carried out for each of the records found in the search cited above.

For the reserved-buffer-updating process represented by the flowchart shown in FIG. 10, differences from the second embodiment are explained below. At the step 1301 for the third embodiment, the buffer control unit 215 adds a port number of the remote site to information used as a key in an operation to search the reserved-buffer information table 101 for a record. The steps 1301 to 1311 are the same as the second embodiment except that the combination consisting of the port pair and the port number of the remote site is used as a substitute for the port pair in the description of these steps.

The third embodiment has been described above. In the third embodiment, the target of a buffer reservation is a combination consisting of the port pair and a port number of the remote site. Thus, connections capable of utilizing a reserved buffer can be limited to connections adopting a protocol of an application layer that can be identified by the port number of the remote site. The third embodiment is therefore particularly effective for communications carried out between ports of the port pair by adopting a variety of protocols.

Next, a fourth embodiment is described by explaining only differences between the fourth and first embodiments as well as differences between the fourth and second embodiments. The fourth embodiment allows a buffer to be reserved for a connection in a remote copy reproduction system similar to that implemented by the first embodiment.

Figures 11, 12:
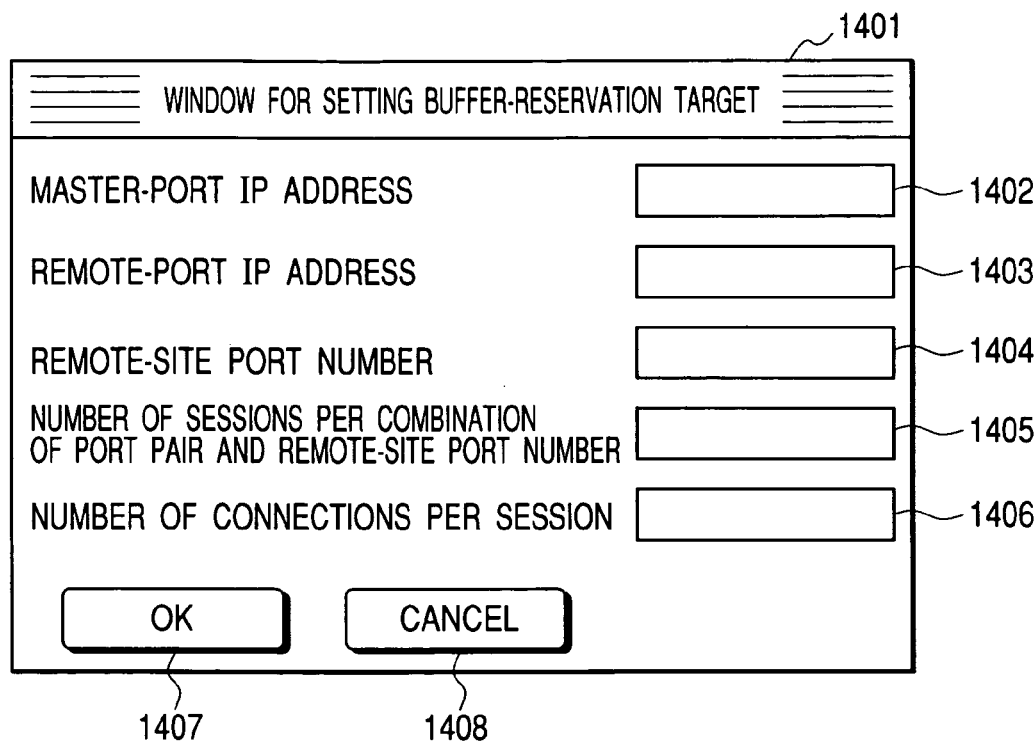
FIG. 11 is a diagram showing a typical display configuration of a reservation-target-setting window according to a third embodiment.
FIG. 12 is a diagram showing a data structure of a reserved-buffer-ID information table according to a fourth embodiment.

First of all, data structures of the fourth embodiment are described by explaining only their differences from those of the first embodiment. FIG. 12 is a diagram showing a data structure of a reserved-buffer-ID information table 1500 for cataloging buffer IDs, which are each used for identifying a reserved buffer when the remote copy program 103 employed in the master storage device 1 uses the reserved buffer. The reserved-buffer-ID information table 1500 is stored in the memory 218 employed in the master storage device 1. The reserved-buffer-ID information table 1500 has an array structure for storing one or more records. Each of the records stored in the reserved-buffer-ID information table 1500 includes master-port IP address 1501, a remote-port IP address 1502 and a buffer ID 1503. For example, in a record 1504, the master-port IP address 1501 is 211.19.1.20, the remote-port IP address 1502 is 133.185.12.20 and the buffer ID 1503 is 10,000 identifying a buffer reserved for a connection between the master-port IP address 1501 and the remote-port IP address 1502.

In addition, a column for storing buffer IDs is added to the reserved-buffer information table 101 shown in FIG. 3(a). The allocated-buffer information table 109 and the network-path information table 108 shown in FIG. 3(b) are the same as those of the first embodiment.

Next, the GUI of the fourth embodiment is described by explaining only their differences from that of the first embodiment. In the case of the fourth embodiment, when the graphical-user-interface control program 107 displays the port-pair-setting window 601 shown in FIG. 4(a), the areas 604 and 605 and the string of characters on their left side are not displayed. The buffer-size-setting window 701 shown in FIG. 4(b) for the fourth embodiment is the same as that of the first embodiment.

Next, operations carried out by the fourth embodiment in accordance with processing procedures are explained by describing only differences from the first and second embodiments. First of all, for the processing procedure represented by the flowchart shown in FIG. 5, differences from the first embodiment are explained.

At the step 801 of the fourth embodiment, the graphical-user-interface control program 107 displays the port-pair-setting window 601 shown in FIG. 4(a) as described above. In addition, when the information management program 104 adds a record to the network-path information table 108, the number of sessions and the number of connections are each set at 1. The steps 802 to 810 are the same as those of the first embodiment.

At the step 811, the buffer control unit 215 issues a buffer ID if a buffer can be reserved. Then, at the next step 812, the buffer control unit 215 transmits a response to a request for a buffer reservation to the storage management device 8. The remote copy program 103 receiving this response to a request for a buffer reservation adds a record comprising the IP addresses of the port pair and the buffer ID to the reserved-buffer-ID information table 1500. The step 813 is the same as that of the second embodiment.

At the step 814, first of all, the remote copy program 103 fetches a port pair from the received request to start a remote copy reproduction and uses the port pair as a key in an operation to search the reserved-buffer-ID information table 1500 for a record. Then, the remote copy program 103 takes a buffer ID 1503 from the record found in the search operation and transmits a request specifying the buffer ID 1503 to the network-protocol processing unit 214 as a request to allocate a buffer. Then, the same processing as the first embodiment is carried out. The step 815 is also the same as the first embodiment.

The process represented by the flowchart shown in FIG. 6 to calculate a recommended buffer size is the same as that for the first embodiment.

Next, for the buffer reservation process represented by the flowchart shown in FIG. 7, differences from the first embodiment are explained below. The steps 1001 to 1006 of the fourth embodiment are the same as those of the first embodiment. At the step 1007, first of all, the buffer control unit 215 issues a buffer ID and, then, includes the buffer ID in information of a record to be added to the reserved-buffer information table 101.

Next, for the buffer allocation process represented by the flowchart shown in FIG. 8, differences from the first embodiment are explained below. At the step 1101 of the fourth embodiment, the buffer control unit 215 uses a buffer ID as information serving as a key for an operation to search the reserved-buffer information table 101 for a record. The steps 1102 to 1104 are the same as those of the first embodiment.

The processing procedure represented by the flowchart shown in FIG. 9 is the same as the second embodiment.

Next, for the buffer-updating process represented by the flowchart shown in FIG. 10, differences from the second embodiment are explained below. At the step 1301, the buffer control unit 215 uses a port pair fetched from a request to update a buffer in an operation carried out to search the reserved-buffer information table 101 for a record. A plurality of records may be found in the search. In this case, the steps 1304 to 1311 are executed for each of the records. The steps 1304 to 1311 themselves are the same as those for the second embodiment.

The fourth embodiment has been described above. In the fourth embodiment, a connection is taken as the target of a buffer reservation so that a reserved buffer can be occupied exclusively by the connection serving as the target of the buffer reservation.

It is to be noted that, in the case of the fourth embodiment, in an application, a reserved buffer identified by a buffer ID can be shared by any two or more connections. Assume for example an application in which a remote copy reproduction is carried out by using a plurality of connections between a plurality of ports on the master storage device 1 and a plurality of ports on the remote storage device 2. In this case, a buffer ID can be shared by the connections.

It is also worth noting that, in the first, second, third and fourth embodiments, in a remote copy reproduction process 815 represented by the flowchart shown in FIG. 5, the remote copy program 103 may also request the network-protocol processing unit 214 to set the maximum value of a congestion window for a used connection at a value equal to the size of the reserved buffer. For more information on the congestion window, refer to the RFC 2581.

In addition, after the size of the reserved buffer is updated to a new value at the step 1311 of the flowchart shown in FIG. 10, the remote copy program 103 may also request the network-protocol processing unit 214 to change the maximum value of the congestion window at the new value of the size of the reserved buffer. Thus, the maximum value of the congestion window can be set at a value suitable for characteristics of the network path. As a result, it is possible to prevent the communication throughput from decreasing due to a congestion window too small in comparison with the performance of the network path.

As described above, the first, third and fourth embodiments have three different targets of the buffer reservation. It is to be noted, however, that the person in charge of system management may also select a target of the buffer reservation in accordance with the configuration of an application that will use the reserved buffer. This feature can be realized for example by having the graphical-user-interface control program 107 employed in the storage management device 8 display a buffer-reservation-target selection window 1601 shown in FIG. 13 before displaying a window for inputting a target of a buffer reservation.

Figure 13:
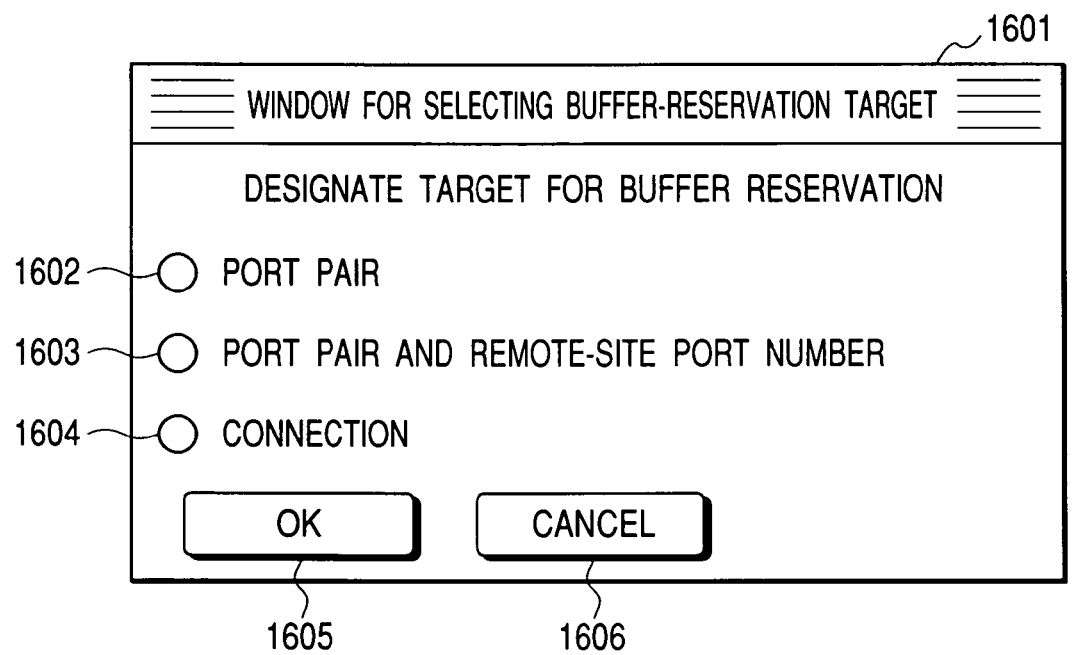
FIG. 13 is a diagram showing a typical display configuration of a buffer-reservation-target selection window.

FIG. 13 is a diagram showing a typical display configuration of the buffer-reservation-target selection window 1601 used by the person in charge of system management to enter a target for which a buffer reservation is to be made. The graphical-user-interface control program 107 employed in the storage management device 8 displays the buffer-reservation-target selection window 1601 on the display unit 227. The person in charge of system management operates the pointing device 229 to set a target of a buffer reservation on the buffer-reservation-target selection window 1601.

The buffer-reservation-target selection window 1601 includes a port-pair selection button 1602, a port-pair and remote-site port-number selection button 1603 and a connection selection button 1604. The port-pair selection button 1602 is a button operated to select a port pair as a target of a buffer reservation. The port-pair and remote-site port-number selection button 1603 is a button operated to select a port pair and the port number of a remote site. The connection selection button 1604 is a button operated to select a connection. In addition, the buffer-reservation-target selection window 1601 also includes an OK button 1605 and a cancel button 1606. The OK button 1605 is a button operated to request the cataloging of a target selected by the person in charge of system management as a target of a buffer reservation. On the other hand, the cancel button 1606 is a button operated to request cancellation of the operation to enter a target selected by the person in charge of system management as a target of a buffer reservation.

The following description explains typical operations of processing to be carried out by the embodiments. First of all, when the graphical-user-interface control program 107 employed in the storage management device 8 detects an operation carried out by the person in charge of system management to start a remote copy reproduction at the step 801, the graphical-user-interface control program 107 displays the buffer-reservation-target selection window 1601 shown in FIG. 13 on the display unit 227. The person in charge of system management then operates the pointing device 229 to select either the port-pair selection button 1602, the port-pair and remote-site port-number selection button 1603 or the connection selection button 1604. After selecting a target of the buffer reservation, the person in charge of system management presses down the OK button 1605 or the cancel button 1606. If the person in charge of system management selects the port-pair selection button 1602, processing is carried out in the same way as the first embodiment. If the person in charge of system management selects the port-pair and remote-site port-number selection button 1603, processing is carried out in the same way as the third embodiment. If the person in charge of system management selects the connection selection button 1604, processing is carried out in the same way as the fourth embodiment.

It is to be noted that other targets of the buffer reservation can be added besides the three targets cited above. In the case of an application carrying out a variety of communications, examples of the other targets are a pair of logical volumes in master and remote sites involved in a remote copy reproduction and a pair of a group comprising a plurality of logical volumes in a master site and a group comprising a plurality of logical volumes in a remote site serving as a target of a remote copy reproduction carried out by the master site.

Next, a fifth embodiment is explained. The fifth embodiment implements a method to update the size of a buffer to cope with a deficit of a cache memory employed in a storage device in the course of a remote copy reproduction in a remote copy reproduction system similar to that implemented by the first embodiment.

In the fifth embodiment, the remote copy program 103 employed in the master storage device 1 periodically collects the size of an available area in the cache memory 102. If the size of an available area in the cache memory 102 decreases to a quantity smaller than an alarming threshold value, the remote copy program 103 searches the reserved-buffer information table 101 by using a port pair being used in remote copy reproduction as a key for a record and reads out a reserved-buffer size 304 from the record found in the search. The person in charge of system management uses the storage management device 8 to specify the alarming threshold value in advance. As an alternative, at an activation time, the remote copy program 103 retrieves a configuration definition file describing various kinds of setting information and reads out the alarming threshold value from the file.

Then, the remote copy program 103 transmits a buffer-control automation request specifying the port pair and the reserved-buffer size to the information management program 104 employed in the storage management device 8. The information management program 104 employed in the storage management device 8 fetches the port pair and the reserved-buffer size from the buffer-control automation request received from the remote copy program 103 and carries out the processing at the steps 802 to 808 of the flowchart shown in FIG. 5 to obtain a recommended buffer size for the port pair. Then, the information management program 104 transmits a request specifying the recommended buffer size and the reserved-buffer size to the buffer control unit 215 employed in the master storage device 1 as a request to update the reserved-buffer size. Receiving the request to update the reserved-buffer size, the buffer control unit 215 carries out the process to update the reserved-buffer size in accordance with the flowchart shown in FIG. 10.

The fifth embodiment has been described above. In the fifth embodiment, if a deficit of a cache memory employed in a storage device is detected in the course of a remote copy reproduction as evidenced by the size of an available area in the cache memory 102 decreasing to a quantity smaller than an alarming threshold value, the size of a reserved buffer used in the remote copy reproduction is updated. The deficit of a cache memory may be caused by a reservation manually made by the person in charge of system management as a reservation to reserve a buffer with an excessively small size. In this embodiment, the size of the reserved buffer is increased to raise the amount of transmitted data. Thus, the deficit of a cache memory can be avoided. As a result, the mainstay job can be prevented from being stopped due to saturation of the cache memory.

In accordance with the embodiment described above, prior to the start of a remote copy reproduction, a buffer having a size large enough for remote copy reproduction communications between ports of a port pair is reserved in a memory area dedicated for the communications so that the memory area dedicated for the communications can be prevented from becoming insufficient due to an increase in number of communications with the hosts. As a result, it is possible to prevent the remote copy reproduction from being suspended and, hence, the mainstay job from being halted.

In addition, in accordance with the embodiment described above, the storage management device varies the size of a buffer in the master storage device in accordance with changes of the latency and bandwidth of a network path between ports of a port pair so that it is possible to avoid a buffer deficit in the event of a path changeover caused by a communication-traffic congestion or a failure occurring in the course of a remote copy reproduction.

Furthermore, in accordance with the embodiment described above, the person in charge of system management is allowed to select either a port pair, a combination consisting of a port pair and the port number of a remote site or a connection as the target of a buffer reservation so that it is possible to make a buffer reservation suitable for conditions of a remote copy reproduction.

Moreover, in accordance with the embodiment described above, when the cache memory becomes insufficient, the size of the already reserved buffer and the congestion window are increased to raise the amount of transmitted data so that the speed at which data is erased from the cache memory can be increased. As a result, the mainstay job can be prevented from being stopped due to saturation of the cache memory.

What is claimed is:

1. A storage device communicating with a host computer and another storage device through a network, said storage device comprising:
an available buffer including a plurality of memory buffers;
an in-use buffer including a plurality of memory buffers already allocated as memory buffers dedicated for communications;
notification means for giving a notice of an available-buffer size to an external inquirer in response to an inquiry made by the external inquirer;
buffer securing means for taking memory buffers having a reserved-buffer size specified in addition to a buffer-reservation target in a request made by an external requester through the network as a request for a buffer reservation out of said available buffer and reserving said taken memory buffers as a reserved buffer for said buffer-reservation target in response to said request for a buffer reservation based on said reserved-buffer size specified in said request;
allocation means for allocating said memory buffers of said reserved buffer to said buffer-reservation target to make said allocated memory buffers a part of said in-use buffer in response to a request made by the external requester as a request to start an application; and
execution means for executing the application communicating by using said in-use buffer allocated by said allocation means.

2. A storage device according to claim 1 wherein said reserved-buffer size is a product obtained as a result of multiplying a bandwidth by a latency where said bandwidth is defined as an amount of data transmitted in a unit time through a connection whereas said latency is defined as a time period from a time of transmitting data through said connection to a time of receiving an acknowledgement of said data.

3. A storage device according to claim 1, further comprising:
means for taking memory buffers having an additional size out of said available buffer and adding said taken memory buffers to the reserved buffer allocated to the buffer-reservation target in response to a reserved-buffer-updating request made by the external requester as a request to increase said reserved buffer by specifying said buffer-reservation target and a value greater than the present size of said reserved buffer as a new size of said reserved buffer; and
means for taking memory buffers having a decreasing size out of a reserved buffer allocated to a buffer-reservation target and returning said taken memory buffers to said available buffer when decreasing said reserved buffer by specifying said buffer-reservation target and a value smaller than the present size of said reserved buffer as a new size of said reserved buffer.

4. A storage device according to claim 1 wherein said application is a remote copy reproduction process to copy data stored in said storage device to said another storage device.

5. A storage device according to claim 1 or 4 wherein said buffer-reservation target is an inter-port communication between a network port of said storage device and a network port of said another storage device.

6. A storage device according to claim 1 or 4 wherein said buffer-reservation target is a combination consisting of a port pair and a number indicating a protocol adopted by said application executed by said another storage devices, said port pair being a pair of a network port of said storage device and a network port of said another storage device.

7. A storage device according to claim 1 wherein said buffer-reservation target is a connection between said storage device and a device serving as a communication partner.

8. A storage device according to claim 1, further comprising:
means which includes a cache memory for temporarily storing data read out from disks and gives a notice of an available storage capacity of said cache memory to the external inquirer in response to an inquiry made by the external inquirer; and
means for taking memory buffers having an additional size from said available buffer and adding said taken memory buffers to a reserved buffer allocated to a buffer-reservation target in response to a reserved-buffer-updating request made by the external requester as a request to increase said reserved buffer by specifying said buffer-reservation target and a value greater than the present size of said reserved buffer as a new size of said reserved buffer.

9. A storage device according to claim 1 wherein said buffer is a buffer for storing data transmitted by adopting a TCP.

10. A storage device according to claim 9 wherein a means for processing a network protocol for communications with said another devices takes the size of said reserved buffer as a maximum value of a congestion window.

11. A storage device according to claim 1 wherein said buffer is a credit for storing data transmitted by adopting a fibre-channel protocol.

12. A storage device according to claim 1 wherein said extraction means for allocating memory buffers as a reserved buffer allocates an area usable as a buffer from a memory in case said available buffer is insufficient.

13. A storage device communicating with a host computer and another storage device through a network, said storage device comprising:
an available buffer including a plurality of memory buffers;
an in-use buffer including a plurality of memory buffers already allocated as memory buffers dedicated for communications;
a network-interface-information acquisition unit for giving a notice of a size of said available buffer to an external inquirer in response to an inquiry made by an external inquirer;
a buffer control unit for taking memory buffers having a reserved-buffer size specified in addition to a buffer-reservation target in a request made by an external requester through the network as a request for a buffer reservation out of said available buffer and reserving said taken memory buffers based on said reserved-buffer size specified in said request, and allocating said memory buffers to said buffer-reservation target for making said allocated memory buffers a part of said in-use buffer in response to a request made by the external requester as a request to start an application; and an application execution unit for executing an application communicating by using said in-use buffer allocated by said buffer control unit.

14. A storage system comprising a storage device communicating with a host computer and another storage device through a network, and a storage management device communicating with said storage device through the network, wherein:

said storage device comprises:

an available buffer including a plurality of memory buffers;

an in-use buffer including a plurality of memory buffers already allocated as memory buffers dedicated for communications;

notification means for giving a notice of an available-buffer size to said storage management device in response to an inquiry made by said storage management device;

buffer securing means for taking memory buffers having a reserved-buffer size specified in addition to a buffer-reservation target in a request made by said storage management device through the network as a request for a buffer reservation out of said available buffer and reserving said taken memory buffers as a reserved buffer for said buffer-reservation reservation target in response to said request for a buffer reservation based on said reserved-buffer size specified in said request;

allocation means for allocating said memory buffers of said reserved buffer to said buffer-reservation target to make said allocated memory buffers a part of said in-use buffer in response to a request made by said storage management device as a request to start an application; and execution means for executing an application communicating by using said in-use buffer allocated by said allocation means; and said storage management device comprises:

means for inquiring of said storage device a size of said available buffer; and means for transmitting the request to start said application to said storage device.

15. A storage system according to claim 14 wherein said reserved-buffer size is a product obtained as a result of multiplying a bandwidth by a latency where said bandwidth is defined as the amount of data transmitted in a unit time through a connection whereas said latency is defined as a time period from a time of transmitting data through said connection to a time of receiving an acknowledgement of said data.

16. A storage system according to claim 14 wherein:

said storage device further comprises:

means for taking memory buffers having an additional size out of said available buffer and adding said taken memory buffers to a reserved buffer allocated to a buffer-reservation target in response to a reserved-buffer-updating request made by said storage management device as a request to increase said reserved buffer by specifying said buffer-reservation target and a value greater than the present size of said reserved buffer as a new size of said reserved buffer; and means for taking memory buffers having a decreasing size out of a reserved buffer allocated to a buffer-reservation target and returning said taken memory buffers to said available buffer when decreasing said reserved buffer by specifying said buffer-reservation target and a value smaller than the present size of said reserved buffer as a new size of said reserved buffer; and said storage management device further comprises means for transmitting said reserved-buffer-updating request.

17. A storage system according to claim 14 wherein said application is a remote copy reproduction process to copy data stored in said storage device to said another storage device.

18. A storage system according to claim 14 or 17 wherein said buffer-reservation target is an inter-port communication between a network port of said storage device and a network port of said another storage device.

19. A storage system according to claim 14 or 17 wherein said buffer-reservation target is a combination consisting of a port pair and a number indicating a protocol adopted by said application executed by said another storage device, said port pair being a pair of a network port of said storage device and a network port of said another storage device.

20. A storage system comprising a storage device communicating with a host computer and another storage device through a network, and a storage management device communicating with said storage device through the network, wherein:

said storage device comprises:

a CPU and a memory;

an available buffer on the memory including a plurality of memory buffers;

an in-use buffer on the memory including a plurality of memory buffers already allocated as memory buffers dedicated for communications;

a network-interface-information acquisition unit for giving a notice of an available-buffer size to said storage management device in response to an inquiry made by said storage management device;

a buffer control unit for taking memory buffers having a reserved-buffer size specified in addition to a buffer-reservation target in a request made by said storage management device through the network as a request for a buffer reservation out of said available buffer and reserving said taken memory buffers as a reserved buffer for said buffer-reservation target in response to said request for a buffer reservation based on said reserved-buffer size specified in said request;

a network-protocol-processing unit for allocating said memory buffers of said reserved buffer to said buffer-reservation target to make said allocated memory buffers a part of said in-use buffer in response to a request made by said storage management device as a request to start a remote copy application; and a remote copy program stored on the memory and executed by the CPU for executing the remote copy application communicating by using said in-use buffer allocated by said network-protocol-processing unit; and said storage management device comprises:

a CPU and a memory, said CPU executing programs stored on the memory, said programs inquiring of said storage device a size of said available buffer and transmitting the request to start said remote copy application to said storage device.

* * * * *